United States Patent
Domosi et al.

(10) Patent No.: US 10,419,207 B2
(45) Date of Patent: Sep. 17, 2019

(54) CRYPTOGRAPHIC APPARATUSES AND METHODS FOR ENCRYPTING AND DECRYPTING DATA USING AUTOMATA

(71) Applicant: Pannon Szoftver Kft., Budapest (HU)

(72) Inventors: Pal Bela Domosi, Debrecen (HU); Geza Horvath, Debrecen (HU); Marianna Salgane Medveczki, Debrecen (HU); Peter Salga, Debrecen (HU)

(73) Assignee: DYNTELL Magyarorszag Kft., Budapest (HU)

( * ) Notice: Subject to any disclaimer, the term of this patent is extended or adjusted under 35 U.S.C. 154(b) by 498 days.

(21) Appl. No.: 15/506,098

(22) PCT Filed: Aug. 26, 2014

(86) PCT No.: PCT/HU2014/000076
§ 371 (c)(1),
(2) Date: Feb. 23, 2017

(87) PCT Pub. No.: WO2015/028830
PCT Pub. Date: Mar. 5, 2015

(65) Prior Publication Data
US 2017/0257212 A1  Sep. 7, 2017

(30) Foreign Application Priority Data
Aug. 26, 2013 (HU) ..................... 1300501

(51) Int. Cl.
*H04L 9/06* (2006.01)
*G06F 9/448* (2018.01)

(52) U.S. Cl.
CPC .......... *H04L 9/0618* (2013.01); *G06F 9/4498* (2018.02); *H04L 9/06* (2013.01); *H04L 2209/122* (2013.01)

(58) Field of Classification Search
CPC ... H04L 9/0618; H04L 9/06; H04L 2209/122; G06F 9/4498
See application file for complete search history.

(56) References Cited

U.S. PATENT DOCUMENTS 4,202,051 A * 5/1980 Davida ................ H04L 9/0668
331/78
5,365,589 A * 11/1994 Gutowitz ................ H04L 9/001
380/263

(Continued)

FOREIGN PATENT DOCUMENTS

WO   2011123575   3/2011

OTHER PUBLICATIONS

Marco Tomassini, Mathieu Perrenoud, "Cryptography with cellular automata", 2001, Applied Soft Computing, vol. 1, Issue 2, pp. 151-160.*

(Continued)

*Primary Examiner* — Farid Homayounmehr
*Assistant Examiner* — Zhimei Zhu
(74) *Attorney, Agent, or Firm* — Wood Herron & Evans LLP

(57) ABSTRACT

The invention is, firstly, a cryptographic apparatus for encrypting unencrypted data, comprising an input module for inputting the unencrypted data and an output module for outputting encrypted data, and a key automaton (44) adapted for converting the unencrypted data into the encrypted data, and the key automaton (44) is an composition of automata said composition of automata having a set of states and a set of input signals identical to each other and being implemented as a permutation automaton without output signals, said composition of automata comprises at least one factor automaton without output signals, each of the unencrypted data and the encrypted data has a character set identical to each other, and the set of states and the set of input signals, (Continued)

respectively, consist of blocks obtained from all possible combinations of said character set, wherein the blocks are of a predetermined block length. The invention is, furthermore, a cryptographic apparatus for decrypting encrypted data. The invention is, thirdly, a cryptographic method for encrypting unencrypted data. The invention is, fourthly, a cryptographic method for decrypting encrypted data.

12 Claims, 15 Drawing Sheets

(56) References Cited

U.S. PATENT DOCUMENTS

| | | | | |
|---|---|---|---|---|
| 6,049,608 | A * | 4/2000 | Ablowitz | H04L 9/0668 380/265 |
| 6,154,541 | A * | 11/2000 | Zhang | H04L 9/3073 380/28 |
| 2002/0023209 | A1* | 2/2002 | Domstedt | H04L 9/08 713/160 |
| 2004/0120524 | A1* | 6/2004 | Carroll | H04L 9/00 380/255 |
| 2004/0218760 | A1* | 11/2004 | Chaudhuri | H04N 7/161 380/217 |
| 2005/0041801 | A1* | 2/2005 | Carroll | G06T 9/00 380/28 |
| 2006/0093141 | A1* | 5/2006 | Stork | H04L 63/10 380/210 |
| 2008/0304667 | A1* | 12/2008 | Mihaljevic | G06F 7/582 380/268 |
| 2009/0092251 | A1* | 4/2009 | Domosi | H04L 9/001 380/255 |
| 2012/0076298 | A1* | 3/2012 | Bolotov | H04L 9/0631 380/255 |
| 2012/0159194 | A1* | 6/2012 | Anderson | H04L 9/002 713/190 |
| 2013/0170638 | A1* | 7/2013 | Tateishi | H04L 9/008 380/28 |
| 2014/0223194 | A1* | 8/2014 | Cooke | H04L 9/0618 713/189 |
| 2015/0033018 | A1* | 1/2015 | Tateishi | H04L 63/08 713/171 |
| 2016/0149866 | A1* | 5/2016 | Dolev | H04L 9/008 726/30 |

OTHER PUBLICATIONS

European Patent Office, International Search Report (Form PCT/ISA/210 and 220, 5 pgs.) and Written Opinion of the international Searching Authority (7 pgs.) dated Feb. 13, 2015.
Zoltan Esik: "Automata Theory" In: Allan kent, James G. Willians: "Encyclopedia of Computer Science and Technology", 1992, Marcel Dekker, NY, XP002734428, ISBN: 0-8247-2276-0 vol. 26, pp. 20-22.
"automata Networks and Products of Automata: In: Domosi, P,; Nehaniv, C.L.: Algebraic Introduction", 2005, SIAM, Philadelphia, XP002734429.

* cited by examiner

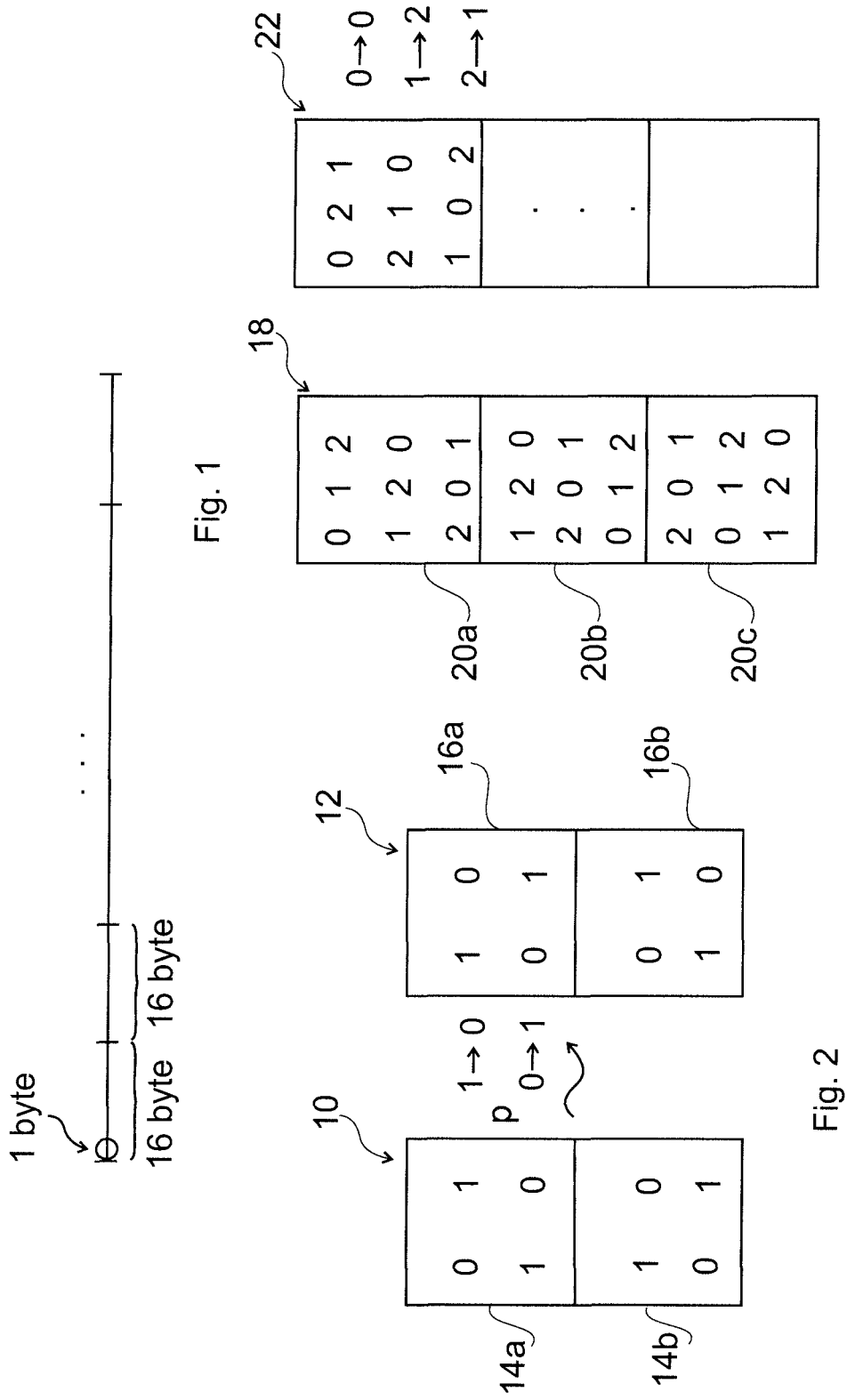

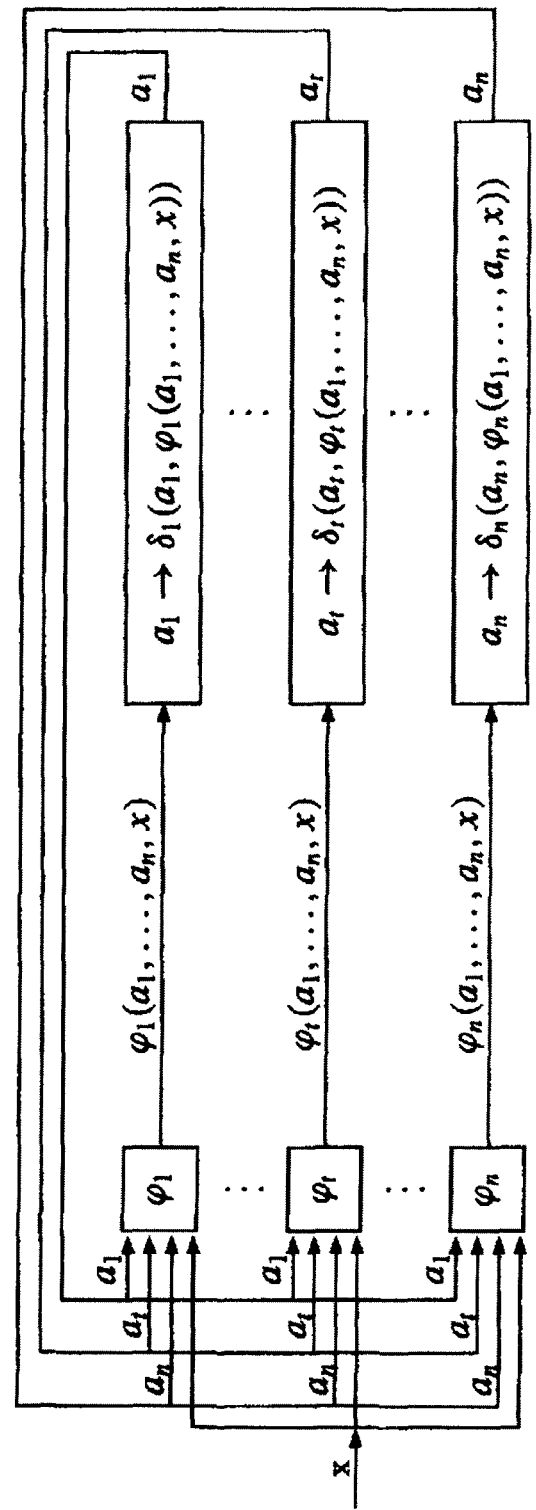

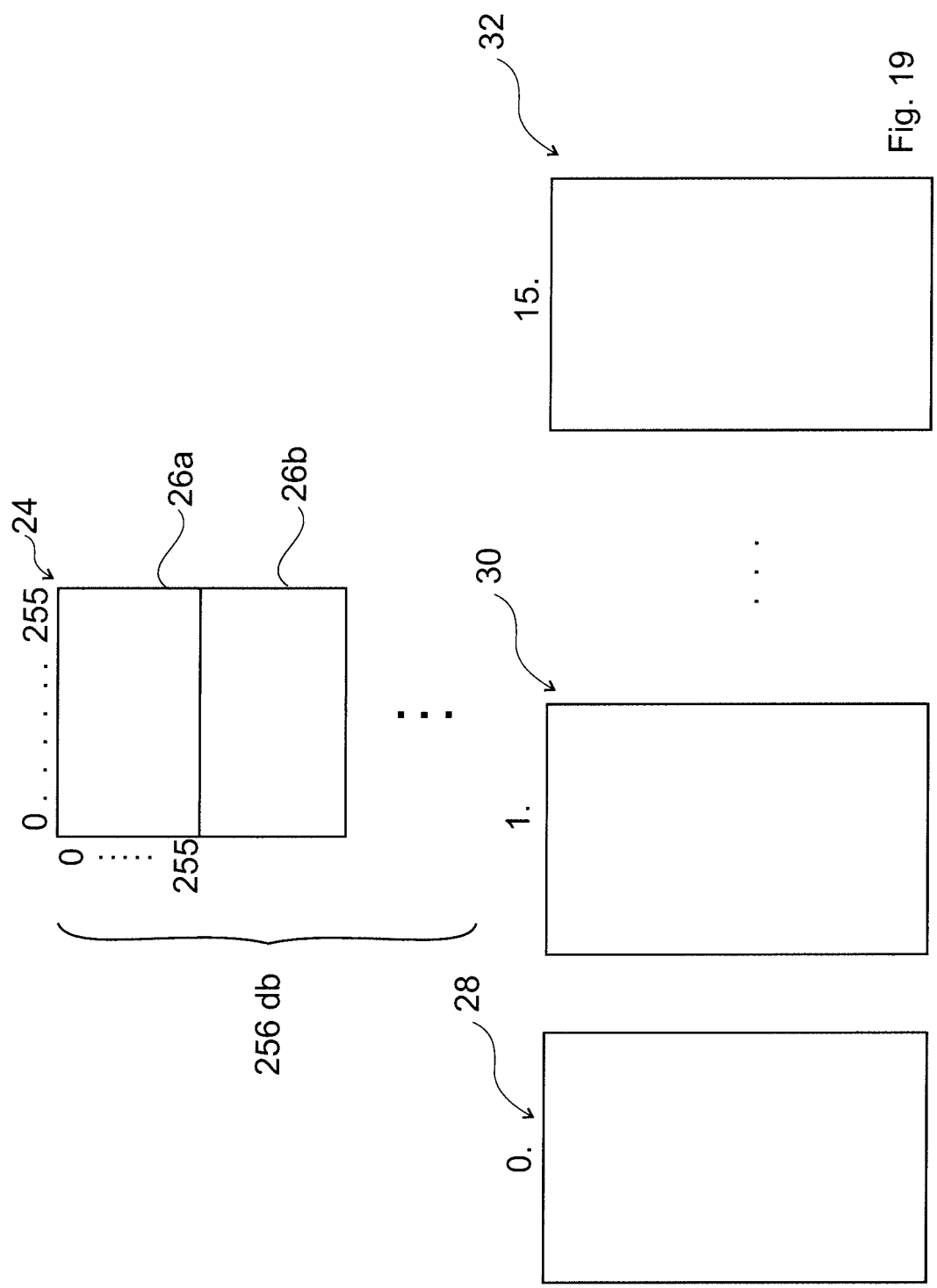

CRYPTOGRAPHIC APPARATUSES AND METHODS FOR ENCRYPTING AND DECRYPTING DATA USING AUTOMATA

This application claims priority, under Section 371 and/or as a continuation under Section 120, to PCT Application No. PCT/HU2014/000076, filed on Aug. 26, 2015, which claims priority to Hungarian Application No. P1300501, filed on Aug. 26, 2013.

TECHNICAL FIELD

The invention relates to a cryptographic apparatus and method for encrypting unencrypted data, as well as to a cryptographic apparatus and method for decrypting encrypted data.

BACKGROUND ART

The encryption or encoding apparatus of a cryptosystem encrypts the plaintext (open text) to be sent in an encrypted form using an encryption key; the encrypted text (ciphertext) is then sent to the receiver of the message, where the decryption or decoding apparatus of the cryptosystem (being at the receiver) decrypts the received ciphertext using a decryption key. It is the common intention of the sender and the receiver that the contents of the plaintext is not to be known by any other party.

As far as the applied encryption keys are concerned, encryption methods can be divided into two major groups:
1. In symmetric-key, or, in other words, private-key cryptosystems the decryption key can be obtained once the encryption key is known, and, vice versa, knowing the decryption key the encryption key can also be obtained. Therefore both keys have to be kept secret, and can be known only by the sender and the receiver of the secret message.
2. In asymmetric-key, or in other words, public-key cryptosystems a public encryption key is applied, the decryption key being known only to the receiver of the secret message. The principle of public key encryption was invented by Diffie and Hellman in 1976 [Diffie, W., Hellman, M. E.: New Directions in Cryptography. IEEE Transactions on Information Theory, vol. IT-22, November 1976, 644-654], before their discovery all cryptosystems applied symmetric keys.

There is a large number of known encryption algorithms and methods, and their development has been accelerated by the increasing use of the Internet. These trends are present in different countries and regions. In the USA, the so-called Advanced Encryption Standard (AES) [National Institute of Standards and Technology: Advanced Encryption Standard (AES). Federal Information Processing Standards Publication 197. Nov. 26, 2001] is slated to replace the so-called Data Encryption Standard (DES) [Kinnucan, P.: Data Encryption Gurus: Tuchman and Meyer. Cryptologia, No. 2 (4), 1978, 371-381; National Bureau of Standards: Data Encryption Standard (DES). Federal Information Processing Standards Publication (FIPS PUB) 46, National Bureau of Standards, Washington, D.C., 1977]. There are ongoing European and Hungarian projects targeted at developing electronic authentication systems and electronic signatures [The implementation of the European directive on electronic signatures, Landwell Interdisciplinary centre for Law & Information Technology, K. U. Leuven 2001, 1-61], and there is a current Japanese project aiming at the implementation of "electronic government" [Yamada, H.: Current Status of E-Government in Japan and its Future Direction—Electronic Application Services, Science & Technology Trends Quaterly Review, 36 (2010), 19-32].

In the modern history of cryptography there are numerous examples for supposedly very safe cryptosystems that were proven to be breakable as a result of scientific and technological development. A cryptosystem based on simple principles of mathematical logic and probability theory, applying a secret key used only once (one-time pad, OTP system), also called Vernam system [Vernam, G. S.: Secret Signaling System. U.S. Pat. No. 1,310,719, 1919] is the only known cryptosystem that is impossible to break. This is the only cryptosystem with a known mathematical proof of being unbreakable. [Shannon, C. E.: Communication Theory and Secrecy Systems. Bell System Technical Journal, 28 (4), 1949, 656-715]. Although the OTP system is the most reliable form of encryption, in many cases it proves to be impractical. In the OTP system each user has to possess a copy of the key, and the key can only be exchanged over secure communications channels (i.e. face to face). The key can be used only once, and in many applications, the size of the key has to reach the size of the text to be encrypted. Thereby, before encrypting and forwarding a new text, the sender and the receiver have to exchange keys in each case over a secure communications channel. The greatest problem posed by this system is, therefore, precisely that the key can never be reused, and, due to the size of the keys, the key exchange may be extremely cumbersome. The Vernam system is a symmetric-key system.

In the twentieth century, encryption systems developed being more effective than ever before. The strongest boost for this development was provided by the computerisation of encryption methods. The civilian version of the German encryption machine, ENIGMA, was finished after the First World War [Scherbius, A.: Chiffrierapparat. Deutches Reich, Reichspatentamt, Patentschrift Nr. 416219, 1918], the military version of which [Korn, W., Röpke, K.: Elektriesche Chiffriermaschine mit Schreibvorrichtung. Deutsches Reich, Reichspatentamt, Patentschrift Nr. 536556, 1929] was widely used by the German military in the Second World War. The first step in breaking ENIGMA was taken by a French spy, Hans-Thilo Schmidt (being German), who gave photocopies that could be used for reconstructing ENIGMA's wiring to French cryptographers who passed on a copy to the Poles [Paillole, P.: Notre espion chez Hitler, Paris, Editions Robert Laffont, 1985]. Subsequently, based on the results of Polish researchers, a mechanised method was developed by Alan E Turing and his group for breaking this cryptosystem [Gordon, W.: The Hut Six story: Breaking the Enigma codes. Allen Lane & New York, McGraw-Hill, London, 1982].

Similar was the fate of the Japanese mechanised encryption system, PURPLE, which was broken by American researchers [Clark, R. W.: The Man who broke "Purple": The Life of the World's Greatest Cryptologist. Littlehampton, West Sussex, UK, Littlehampton Book Services, 1977].

The public-key encryption method developed by Ron Rivest, Adi Shamir and Len Adleman in 1977, disclosed in U.S. Pat. No. 4,405,829, has become widely known worldwide under the name RSA (from the initials of the inventors). Today, the RSA algorithm plays a major role in almost all computer and telecommunications systems where the security of digital data has to be ensured. Examples include e-commerce and e-banking systems, ensuring a secure connection between the web server and the clients, the authenticity and confidentiality of e-mail, the use of remote terminals and authentication using electronic credit card systems.

In 1977, Martin Gardner, the world-famous columnist of Scientific American said the following on the possibility of breaking a 125-digit RSA key: [Gardner, M.: Mathematical Games: A New Kind of Chipher That Would Take Millions of Years to Break. Sci. Amer., 237, 1977, 120-124]: "If the present-day best known algorithm and the fastest computers are used, Rivest estimates the necessary resolution time should be approximately 40 quadrillion years!" Less than twenty years passed when in 1996 a 130-digit RSA key was resolved, and nine years later, in 2005, the 640 bit version of RSA was also broken [http://en.wikipedia.org/wiki/RSA_Factoring_Challenge]; with the 768 bit version being also broken in 2009. [Kleinjung, T., Aoki, K., Franke, J., Lenstra, A. K., Thomé, E., Bos, J. W., Gaudry, P., Kruppa, A., Montgomery, P. L, Osvik, D. A., Riele, H. T., Timofeev, A., Zimmermann, P.: Factorization of a 768-bit RSA modulus. In: Rabin, T. (ed.): Advances in Cryptology-CRYPTO 2010, Proc. 30th Annual Cryptology Conference, Santa Barbara, Calif., USA, Aug. 15-19, 2010, 333-350], and one year later RSA 1024 was broken applying a new method based on injecting a fault in the processor of the targeted system. [Pellegrini, A., Bertacco, V., Austin, T.: Fault-Based Attack of RSA Authentication. Univ. Michigan, 2010, http://web.eecs.umich.edu/~taustin/papers/RSAFault_DATE10. pdf].

A further problem related to cryptosystems is that the security of the widely using public key cryptosystems is based on assumptions that have not been theoretically proven yet. This also applies to the Diffie-Hellman algorithm based on the discrete logarithm problem, [Diffie, W., Hellman, M. E.: New Directions in Cryptography. IEEE Transactions on Information Theory, vol. IT-22, November 1976, 644-654] as well as to the ElGamal algorithm based on the same problem [ElGamal, T.: A public key cryptosystem and a signature scheme based on discrete logarithms. a.) Advances in cryptology: Proceedings of CRYPTO 84. Lecture Notes in Computer Science. 196. Santa Barbara, Calif., United States: Springer-Verlag. pp. 10-18. b.) IEEE Trans. on Inf. Theory, 31 (1985), 469-472], and to the RSA algorithm that is based on the problem of prime factorization [U.S. Pat. No. 4,405,829]. The experienced drawbacks call for the research and development of cryptosystems based on novel principles. In addition to the fact that the security of these systems is based on unsolved mathematical problems, because of the complexity of the required operations—which in many cases involve high storage space requirements—the systems are impractical. [Buchmann, J. A.: Introduction to Cryptography, 2nd edition. In: Undergraduate Texts in Mathematics, Springer-Verlag, N.Y., Berlin, Heidelberg, 2004]. From a speed aspect, public key systems are also less effective than many symmetric cryptosystems. In practice, therefore these public key systems are usually used in combination with symmetric key systems. Thereby, the usefulness and importance of symmetric key systems is not decreased by the widespread application of public key cryptography.

In 1977, the symmetric key method of Carl Meyer and Walter Tuchman was standardized in the USA as the above mentioned Data Encryption Standard. For an encryption stronger than achievable by DES, the so-called Triple DES, having a triple key length of 168 bits, was later suggested. [National Institute of Standards and Technology: Specifications for the Triple Data Encryption Algorithm (TDEA) Block Cipher. Technology Administration, U. S. Dept. Of Commerce, Special Publication 800-67, 2004, 1-30.], however, a better alternative, applying two keys and being as effective as Triple DES, was suggested by Tuchman [National Institute of Standards and Technology: Federal Information Processing Standards Publication (FIPS PUB) 46-3, National Institute of Standards and Technology, Gaithersburg, Md., 1999]. This latter dual-key system is presently used under the name 3DES. The DES system may be considered as outdated, since the key can be broken in less than a day [Sciengines: Break DES in less than a single day. http://www.sciengines.com/company/news-a-events/74-des-in-1-day.html].

In 2011 it was proven that also 3DES is not secure: applying a side-channel attack (i.e. exploiting certain characteristics of the physical devices implementing the encryption algorithm rather than the characteristics of the algorithm itself), German researchers were able to crack 3DES in only a few hours. [Oswald, D. and Paar, C.: Breaking Mifare DesFire MF3ICD40: Power Analysis and Templates in the Real World. Workshop on Cryptographic Hardware and Embedded Systems-CHES 2011, LNCS 6917, 2011, pp 207-222].

Back in 2001, a new standard encryption algorithm, the Advanced Encryption Standard was introduced in the USA, which has since superseded DES. In 2009, new advances in cryptanalysis were published that pointed out certain weaknesses of the AES algorithms. [Schneier, B.: Another New AES Attack. Schneier on Security, Jul. 30, 2009, http://www.schneier.com/blog/archives/2009/07/another_new_aes.html]. In 2011, an attack (theoretically) capable of key recovery was developed against the 128, 192, and 256 bit AES versions. [A., Khovratovich, D., Rechberger, C.: Biclique Cryptanalysis of the Full AES. Lee, D. H., Wang, X. (eds.), Advances in Cryptology—ASIACRYPT 2011. 17th International Conference on the Theory and Application of Cryptology and Information Security, Seoul, South Korea, Dec. 4-8, 2011, LNCS 7013, Springer-Verlag, Heidelberg, 2011, 344-371]. In spite of the above, AES is still considered secure.

Some cryptosystems designed using automata theory are based on Mealy automata or on their generalisation, while others are based on cellular automata. In systems based on Mealy automata the plaintext is fed to a Mealy automaton as an input, and the ciphertext is obtained as the output generated under the effect of this input. Decryption is performed similarly, except that during decryption the ciphertext becomes the input and the plaintext will be the output. In systems based on cellular automata the plaintext is used as a state of the cellular automaton, and the ciphertext is obtained as the state reached after a predetermined number of transitions. Decryption is performed in a similar manner; starting from the ciphertext as a state the initial state is determined which is the decrypted text.

A common problem of these known cryptosystems based on automata theory is that they have serious application difficulties: some of them can be broken [Dawei, D. Wu, K., Huanguo, Z.: Cryptanalysis on a finite automaton public key cryptosystem, Science in China, Series E, Vol 39, No 1 (1996), 27-36 Bao, F.: Cryptoanalysis of partially known cellular automata. In: IEEE Trans. on Computers, 53 (2004), 1493-1497; Meier, W. and Staffelbach, O.: Analysis of pseudo random sequences generated by cellular automata. In: Davies, D. W. (ed.), Proc. Conf. Advances in Cryptology—EUROCRYPT '91, Workshop on the Theory and Application of Cryptographic Techniques, Brighton, UK, Apr. 8-11, 1991, LNCS 547 Springer-Verlag, Berlin, 1991, 186-199], while in case of others the selection of the key automaton poses difficulties [Guan, P.: Cellular automaton public key cryptosystem. Complex Systems, 1 (1987), 51-56].

The connection of different automata through various communication links leads to the notion of "composition of automata" [Gécseg, F.: Products of Automata. EATCS Monogr. Theoret. Comput. Sci. 7, Springer-Verlag, Berlin, Heidelberg, New York, Tokyo, 1986]. A substantial body of literature in this important scientific field has been published by researchers belonging to the automata-theory school centred around Ferenc Gécseg in Szeged, Hungary [Dömösi, P., Nehaniv, C. L.: Algebraic Theory of Automata Networks. An Introduction. SIAM Monographs on Discrete Mathematics and Applications, 11, SIAM, Philadelphia, 2005; Gécseg, F.: Products of Automata. EATCS Monogr. Theoret. Comput. Sci. 7, Springer-Verlag, Berlin, Heidelberg, New York, Tokyo, 1986]. The specific concept of automaton also applied in cryptography, the cellular automaton, can also be regarded a special composition of automata, where the cells functioning as the members of the composition are composed of one and the same type of elementary automata, and the pattern of the communication links and connections between these elementary automata is a simple network. Despite the large number of publications on compositions of automata (authored predominantly by Hungarian researchers), no cryptographic applications of the results have been disclosed so far.

In Hungarian patent with registration number 227 781 a key automaton without output signals (also called automaton without outputs) having initial and final states is applied in an apparatus and method adapted for encryption and decryption of information. According to the document the applied key automaton performs encryption of open data set character by character assigning an encrypted counterpart of variable length to each character, the encryption performed according to the document generating a ciphertext with a length substantially exceeding the length of the plaintext.

A similar solution is disclosed in Hungarian patent with registration number 229 534 (P 08 00148), wherein data encryption and decryption are applied for protecting conditional access broadcasting and datacasting.

The apparatuses and methods according to Hungarian patents Reg. No. 227 781 and 229 534 have the common disadvantage that the ciphertext is significantly longer than the plaintext, with the ciphertext even being multiple times longer than the plaintext.

In view of the known solutions, there is a demand for apparatuses and methods for encrypting and decrypting data that do not cause large-scale size blowup of encrypted data with respect to the corresponding unencrypted data, and preferably comprise a key that is more secure than the keys applied in known encryption/decryption apparatuses and methods.

DISCLOSURE OF THE INVENTION

The primary object of the invention is to provide apparatuses and methods adapted for encrypting and decrypting data which are free of the disadvantages of prior art solutions to the greatest possible extent.

A further object of the invention is to provide apparatuses and methods for encrypting and decrypting data that do not cause large-scale size blowup of encrypted data with respect to the corresponding unencrypted data, and preferably comprise a key that is more secure than the keys applied in known encryption/decryption apparatuses and methods.

The objects of the invention can be achieved by the apparatuses according to claims 1 and 2, and the methods according to claims 9 and 11. Preferred embodiments of the invention are defined in the dependent claims.

BRIEF DESCRIPTION OF THE DRAWINGS

Preferred embodiments of the invention are described below by way of example with reference to the following drawings, where FIG. 1 is a schematic drawing illustrating how data are split into blocks having a block length of 16 bytes, FIG. 2 illustrates Latin cubes obtained by performing permutations on a two-element set, FIG. 3 shows a Latin cube of a three-element set, and illustrates the generation of a further Latin cube, FIG. 12 is the flow diagram of the operation of a temporal product, FIG. 13 is the flowchart of the operation of a general Glushkov product, FIG. 19 is a drawing illustrating a 16-byte Latin cube and its permutations.

MODES FOR CARRYING OUT THE INVENTION

Figure 5:
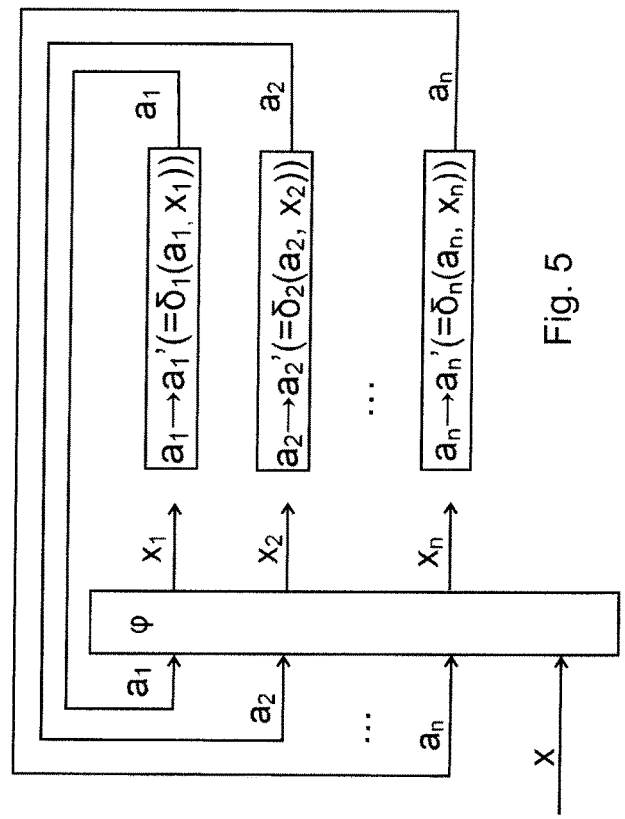
FIG. 5 is a flowchart illustrating the operation of a Glushkov product.

The invention relates to a cryptographic apparatus for encrypting unencrypted data comprising an input module for inputting unencrypted data, and an output module for outputting encrypted data, as well as a key automaton adapted for converting the unencrypted data into the encrypted data.

The invention also relates to a cryptographic apparatus for decrypting encrypted data comprising an input module for inputting encrypted data, and an output module for outputting unencrypted data, as well as a key automaton adapted for converting the encrypted data into the unencrypted data.

In case of both the cryptographic apparatus for encrypting unencrypted data and the cryptographic apparatus for decrypting encrypted data according to the invention the key automaton is a composition of automata, said composition of automata having a set of states and a set of input signals identical to each other and being implemented as a—preferably finite—permutation automaton without output signals, said composition of automata comprises at least one (typically more than one)—preferably finite—factor automaton without output signals, each of the unencrypted data and the encrypted data has a character set identical to each other, and the set of states and the set of input signals, respectively, consist of blocks obtained from all possible combinations (variations with repetition) of said character set, wherein the blocks are of a predetermined block length. The value of the predetermined block length is preferably at least two, since the term "block" can only be used in its typical sense in that case. However, the apparatuses and methods according to the invention may be applied in case the block length is one.

The invention relates to a cryptographic method for encrypting unencrypted data wherein the unencrypted data are converted into encrypted data applying a key automaton.

The invention further relates to a cryptographic method for decrypting encrypted data wherein the encrypted data are converted into unencrypted data applying a key automaton.

In case of both the cryptographic method for encrypting unencrypted data and the cryptographic method for decrypting encrypted data according to the invention a composition of automata is applied as the key automaton, said composition of automata has a set of states and a set of input signals identical to each other, is implemented as a—preferably finite—permutation automaton without output signals, and comprises at least one (but typically more than one)—preferably finite—factor automaton without output signals, each of the unencrypted data and the encrypted data has a character set identical to each other, and the set of states and the set of input signals, respectively, consist of blocks obtained from all possible combinations of said character set, wherein the blocks are of a predetermined block length. The set of states and the set of input signals comprise all of the possible combinations having this length (the block length), and do not comprise any block of any other length.

In the apparatuses and methods according to the invention, therefore, the composition of automata is implemented as a—preferably finite—permutation automaton without output signals, i.e. it behaves as a permutation automaton.

Since a composition of automata typically comprises more than one factor automata, the transition matrix of the composition of automata is much larger than the transition matrix of any factor automaton. In the context of the present specification, therefore, the phrasing a given automaton or composition of automata is implemented as a "permutation automaton" is taken to mean that it is structured as a permutation automaton, i.e. the rows of the transition matrix thereof are permutations of the set of states.

It is to be noted that it also is possible to define a composition of automata implemented as a permutation automaton—for example, obtained as a product of automata—wherein the individual factor automata of the product are not permutation automata.

Compared to known methods also applying key automata, the apparatuses and methods according to the invention are modified such that, instead of being processed character by character, the—in case of encryption, the unencrypted (open), in case of decryption, the encrypted—data, e.g. text, are processed by the inventive apparatuses and methods as character strings of a given block length k. Each characters of such character strings of a block length k are processed (i.e. encrypted or decrypted) in a parallel manner, in a single step. The key automaton is chosen such that the input signals and the states thereof are character strings of a given block length k (i.e. its set of states and set of input signals comprise character strings of that length). Utilising an appropriate encryption algorithm it can be provided that the encrypted (secret) text starts with a randomly chosen character string of a length k, and the rest of the encrypted text contains exactly the same number of character strings having a length k as does the plaintext. (The length of the plaintext is, of course, not always—or indeed, is typically not—a multiple of k. Therefore the plaintext has to be extended by adding blank characters which do not have an actual role such that its length becomes a multiple of k.)

A splitting of unencrypted data into sections having a block length k is illustrated in FIG. 1. If k is high enough (e.g., as shown in the drawing, preferably k=16 bytes), then the storage of the transition table of the key automaton would become infeasible because of the high amount of storage required by the key automaton. (In case of k=16 bytes, the number of states being $2^{128}$ and the number of input signals being $2^{128}$, the amount of required storage is $2^{260}$ bytes, since the transition table has $2^{258}$ elements, where each element requires 16 bytes of storage). For this reason—as it is spelled out herebelow in greater detail—the key automaton is expediently chosen, e.g., to be a composition of automata consisting of one or more Glushkov-powers of an automaton with a size that may be feasibly stored.

Definitions required for understanding the invention are disclosed below.

A composition of automata is a system of automata wherein the individual automata are connected to one another via a communication network of communication links. Automata can change their states at discrete time instances, which state change may be described utilising the actual states and the local transition function of a global input. The local state transitions collectively result in a global state transition across the whole automata-network. The notion of a composition of automata is a generalisation of the notion of cellular automaton in a direction where, in addition to the states of the individual cells (acting as elementary automata) the global transition is also affected by external inputs. In case all the components of the composition of automata have one identical set of states, the composition of automata is said to be state-homogeneous. Each of the global inputs—which are also termed as input signals—may also be regarded as a transformation of the global set of states into itself (i.e. the input signals do not lead out of the set of states of the composition of automata). Applying one input signal after another yields further transformations.

For an arbitrary set H, let |H| denote the cardinality of the set H. A matrix of which each row and each column is a permutation of the elements of H is a Latin square over the set H. Matrices consisting of |H|×|H| rows and |H| columns of which the k·|H|+1-th, k·|H|+2-th, . . . , (k+1)·|H|-th rows, as well as the k+1-th, |H|+k+1-th, . . . , (|H|−1)·|H|+k+1-th rows form a Latin square over H for every k=0, 1, . . . , |H|−1 are termed Latin cubes over H.

In FIGS. 2 and 3, Latin cubes 10, 12, 18 corresponding to a two-element set ({0,1}), and a three-element set ({0,1,2}) are shown.

In case of FIG. 2 the cardinality of the set is two, i.e. the Latin cubes 10, 12 consist of four rows and two columns. Since all of the rows and columns of the 2×2 blocks shown in the figure constitute a permutation of the elements of the set, the Latin cubes 10, 12 shown, respectively, on the left and right in FIG. 2, can be divided into respective Latin squares 14a, 14b and 16a, 16b. It is also illustrated in FIG. 2 that by performing the substitutions p (1→0 and 0→1) the cube 12 is obtained from the Latin cube 10.

According to the definition above, the Latin cube 10 is indeed a Latin cube over {0,1} since its first and second, third and fourth, first and third and second and fourth rows form Latin squares over {0,1}. Accordingly, a Latin cube is obtained when the conditions defining a Latin square (each row is a permutation) hold—in addition to the Latin squares

14a, 14b—also for the first and third rows, as well as for the second and fourth rows, of the Latin cube 10.

On the left of FIG. 3 a Latin cube 18 of a three-element set ({0,1,2}) is shown. The Latin cube 18 can be divided into Latin squares 20a, 20b, 20c. The Latin cube 18 is also special because it has a regular structure described as follows: The first row of the Latin square 20a is 0,1,2 (i.e. the elements of the set taken in order). The next row of the Latin square 20a is obtained from the previous row by shifting the first element (0) to the end of the row. The third row can be obtained from the second one in a similar manner, by shifting the next element (1) to the end, thereby obtaining the last row (2,0,1) of the Latin square 20a. The second row of the Latin square 20a is chosen as the first row of the Latin square 20b, while the third row of the Latin square 20a is chosen as the first row of the Latin square 20c. The further rows of the Latin squares 20b, 20c are generated in the same manner (by shifting the first element to the end of the row) as in the case of the Latin square 20a. It follows from the above that in order to reproduce the Latin cube 18 it is sufficient to store the first row thereof (the first row of the Latin square 20a) together with the rule applicable within the given Latin squares, and either the rule stating how the first rows of the further Latin square may be obtained from the first row of the first Latin square 20a, or a rule specifying the rows of the first Latin square with which the further first rows are identical with.

FIG. 3 illustrates how a further Latin cube 22 may be formed from the Latin cube 18. The elements of the first Latin square of the Latin cube 22 can be obtained from the Latin square 20a applying the mappings 0→0, 1→2 and 2→1. Further elements of the Latin cube 22 can be obtained applying the rules used in the Latin cube 18, and thus it is sufficient to store only the first row of these further Latin cubes. A Latin cube characterised by a 0,2,1 first row is obtained from the Latin cube having a 0,1,2 first row, but, by way of example the Latin cube characterised by the first row 2,0,1 may also be generated in a similar manner. The application of the above described rules allows the reduction of the storage space required for a Latin cube compared to the case where an entire Latin cube has to be stored.

In case only the first condition holds, i.e. the $k \cdot |H|+1$-th, $k \cdot |H|+2$-th, ..., $(k+1) \cdot |H|$-th rows of the matrix form a Latin square over H for each $k=0, 1, \ldots, |H|-1$ then a Latin left semi-cube over H is formed, while in case only the second condition holds, i.e. the $k+1$-th, $|H|+k+1$-th, ..., $(|H|-1) \cdot |H|+k+1$-th rows of the matrix form a Latin square over H for each $k=0, 1, \ldots, |H|-1$, the a Latin right semi-cube over H is formed.

An automaton without output signals is an algebraic structure consisting of two non-empty sets, namely, the set of states and the set of input signals, and a function named transition function that maps the Cartesian product of the set of states and the set of input signals into the set of states. Therefore, an automaton without output signals is usually defined by the formula $A=(A,X,\delta)$, where A is the set of states, X is the set of input signals, and $\delta: A \times X \to A$ is the transition function (which assigns a state to each pair having a state as its first element and an input signal as its second element).

The transition function may thus be characterised by that this type of function assigns a state to all such pairs of which the first element is a state and the other element is an input signal. An automaton without output signals is an initial automaton without output signals if there is defined a special element of the set of states that is called the initial state. In case of an initial automaton without output signals (a few times referred to below simply as 'automaton') the definition $A=(A, a_0, X, \delta)$ is typically used, where $a_0$ denotes the initial state.

In the following it is assumed that the investigated automaton has a finite set of states and a finite set of input signals. It is also supposed that both the set of states and the set of input signals are ordered sets, and accordingly, reference shall be made below to the zeroth, first, second, ..., last elements thereof. (For technical reasons the elements are numbered starting from zero rather than one.)

In case of finite set of states and set of input signals the transition function—which is abstract in its general form—is typically written in matrix form, called transition matrix. The transition matrix has as many rows as the number of the input signals of the automaton, and as many columns as the number of the states of the automaton. An element k in the $i^{th}$ row (numbering started from zero) and $j^{th}$ column (numbering started from zero) of the transition matrix will be the index number (numbering started from zero) of the state which is assigned to the pair consisting of the $j^{th}$ state and the $i^{th}$ input signal by the transition function. Of this element k of the $i^{th}$ row and $j^{th}$ column of the transition matrix it is said that the $i^{th}$ input signal takes the automaton from the $j^{th}$ state to the $k^{th}$ state. (Another typical phrasing for this is saying that under the effect of the $i^{th}$ input signal the automaton goes from the $j^{th}$ state into the $k^{th}$ state.)

Thereby, the rows of the transition matrix correspond to the input signals of the automaton, as well as the columns to the states thereof, while the transition matrix itself corresponds to the transition function of the automaton. Input signals are therefore denoted by the row numbers of the matrix, while states are denoted by the column numbers thereof. In the following—where it cannot be misunderstood—the input signals and the states are sometimes identified by their number.

For instance, in case of the automaton $A=(\{a_0,a_1,a_2\}, \{x_0,x_1\}, \delta)$, for the transition function values $\delta(a_0, x_0)=a_1$, $\delta(a_0, x_1)=a_2$, $\delta(a_1, x_0)=a_0$, $\delta(a_1, x_1)=a_0$, $\delta(a_2, x_0)=a_1$, $\delta(a_2, x_1)=a_1$ the transition matrix is the following:

| $\delta$ | $a_0$ | $a_1$ | $a_2$ |
|---|---|---|---|
| $x_0$ | $a_1$ | $a_0$ | $a_1$ |
| $x_1$ | $a_2$ | $a_0$ | $a_1$ |

In this example, the $0^{th}$ row of the transition matrix is labelled by $x_0$, the first row is labelled by $x_1$, the $0^{th}$ column is labelled by $a_0$, the first column by $a_1$, and the second column by $a_2$.

A finite-length sequence consisting of the elements of the set of states (which may comprise repetitions) is called a state sequence, while a finite-length sequence consisting of the elements of the set of input signals (also possibly containing repetitions) is called an input signal sequence. (State sequences and input signal sequences having unitary length, i.e. consisting of a single element are also allowed.) Signal sequences consisting of the (binary) elements 0 and 1 are called binary sequences or binary strings. In the following—as it is usual—the commas separating the elements are omitted for both state sequences and input signal sequences. If a state sequence $a_1 a_2 \ldots a_s$ has at least three elements, then the states $a_2, a_3, \ldots,$ and $a_{s-1}$ are (also) called the intermediate states of the state sequence. One- and two-element state sequences therefore have no intermediate state.

The transition function of an automaton may be extended in such a way that to each state and input signal sequence a state sequence is assigned by the extended transition function as follows:

Consider a state a, and let $x_1 x_2 \ldots x_s$ be an input signal sequence (where $x_1, x_2, \ldots,$ and $x_s$ are input signals). Let $a_1$ denote the state into which the automaton is taken from state a by the input signal $x_1$, $a_2$ the state into which the automaton is taken from the state $a_1$ by the input signal $x_2$, $a_3$ the state into which the automaton is taken from the state $a_2$ by the input signal $x_3, \ldots,$ and $a_s$ the state into which the automaton is taken from the state $a_{s-1}$ by the input signal $x_s$. In this case, according to the definition, the extended transition function assigns to the pairs consisting of the state a and the input signal sequence $x_1 x_2 \ldots x_s$ the state sequence $a_1 a_2 \ldots a_s$. It can be said that the automaton is taken from the state a to the state $a_s$ through the state sequence $a_1 a_2 \ldots a_{s-1}$ by the input signal sequence $x_1 x_2 \ldots x_s$.

In the most general sense, the term "character set" refers to an ordered, nonempty, finite set (by way of example, in case of binary data, the numbers {0,1}, in case of a text, the letters of the alphabet, etc.). The data to be encrypted or the data to be decrypted may generally be called also a "text"; in the following also this term shall be used frequently. Character sequences formed utilising the character set of the unencrypted (open) text or the encrypted (secret) text shall also be termed "character strings" The number of a character string formed using a given character set is taken to be the lexicographic order number of character strings having the same length, formed using the same character set, minus one. (Which implies that the numbering of character strings also starts with zero.)

According to the invention, in the course of the encryption process applying the key automaton, for a fixed natural number b an encrypted character string having a length b is generated for each unencrypted character string of length b of the plaintext, and the ciphertext is then obtained by concatenating (placing one after the other and tacking) the character strings so generated. As it is presented below, the encrypted data (e.g. the ciphertext) preferably start with a randomly chosen character string also having a length b.

Figure 4:
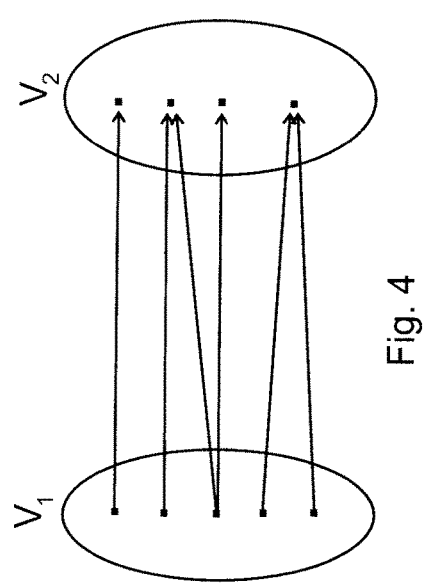
FIG. 4 is a schematic drawing illustrating a bipartite graph not comprising an isolated vertex.

A finite directed graph, or, in short, a digraph, is a pair D=(V,E), where for a natural number n, V={1, . . . , n} is the set of vertices, and E is a set of pairs in V, i.e. a set of edges. E specifies those vertices to which the edges are connected. For an edge (i, j)∈E, i is the starting point of edge (i, j), while j is the end point of the edge (i, j). A vertex k∈V is said to be fitted on edge (i,j)∈E in case k∈{i,j}. A vertex is isolated if it is not fitted on any of the edges. A directed graph D may be defined in the simplest manner by an n×n matrix having 1 in row i and column j in case (i,j)∈E (i.e., the nodes i and j are connected by an edge), or else having 0 in all other cases. D is called a bipartite directed graph in case the set V of its vertices may be decomposed into two sets A and B such that for each edge in E it is true that the starting point thereof is in A and the end point is in B. It is only expedient to apply in relation to the apparatuses and methods according to the invention such bipartite directed graphs that do not comprise any isolated vertices. Such a bipartite graph without isolated vertices is illustrated in FIG. 4. In FIG. 4 graph edges are indicated by arrows connecting the sets $V_1$ and $V_2$. Since each node in the sets has an arrow going out therefrom or coming in thereto, the illustrated sets do not contain any isolated vertices. As the sets V.sub.1 and V.sub.2 do not have any common elements, the graph illustrated in FIG. 4 is a bipartite graph.

Let n be a fixed natural number, and let an $i^{th}$ automaton be assigned to each natural number i between 1 and n. Take a finite nonempty set X, and a feedback function φ which assigns to the vectors formed from the states of the automata under consideration and the elements ($a_1, \ldots, a_n$, x) of X the vectors ($x_1, \ldots, x_n$) formed from the input signals of the automata. In the vectors, $a_1$ denotes a state of the first automaton, . . . , $a_n$ denotes a state of the $n^{th}$ (last) automaton, x denotes an element of the set X (the set of input signals), $x_1$ an input signal of the first automaton, . . . , and $x_n$ an input signal of the $n^{th}$ (last) automaton. The Glushkov product of the considered automata with respect to the feedback function φ is defined to be the automaton with a set of states being the set of vectors ($a_1, \ldots, a_n$) formed from the states of the automata under consideration, where $a_1$ denotes a state of the first automaton, . . . , $a_n$ denoting a state of the nth (last) automaton. The set of input signals of the composition of automata yielded by the Glushkov product is therefore the set X, with an input signal x having the components $x_1, \ldots, x_n$ taking the Glushkov product automaton from such a state ($a_1, \ldots, a_n$) into the state ($a'_1, \ldots, a'_n$). The state ($a'_1, \ldots, a'_n$) is obtained as follows:

1. The vector ($x_1, \ldots, x_n$) that is assigned by the function φ to the vector ($a_1, \ldots, a_n$, x) is determined.
2. $a'_1$ will be the state that is found in the $j_1$-th row and $i_1$-th column of the transition matrix (table) of the first automaton of the product automaton, . . . , $a'_n$ will be the state found in the $j_n$-th row and $i_n$-th column of the transition matrix of the $n^{th}$ (last) automaton of the product automaton.

Where $j_1$ is the number of input signal $x_1$ and $i_1$ is the number of state $a_1$ in the transition matrix of the first automaton, . . . , $j_n$ is the number of input signal $x_n$ and $i_n$ the number of state $a_n$ in the transition matrix of the $n^{th}$ (last) automaton. The last argument of the feedback function is called an input argument, while the other arguments of the function are called state arguments.

The Glushkov product is illustrated in FIG. 5. In addition to x, the states $a_1, a_2, \ldots, a_n$ are also among the inputs of the function φ. It is also shown in FIG. 5 that the Glushkov product of the automata with respect to the function φ can be written using transition functions. $\delta_i$ denotes the transition function of the $i^{th}$ component automaton. Using the transition functions, the above can be written as $$a'_i = \delta_i(a_i, x_i)$$

for every i.

As it is illustrated in FIG. 5, the Glushkov product operates in a parallel manner, in the sense that the component automata go into the new state components in the same single step.

Figure 6:
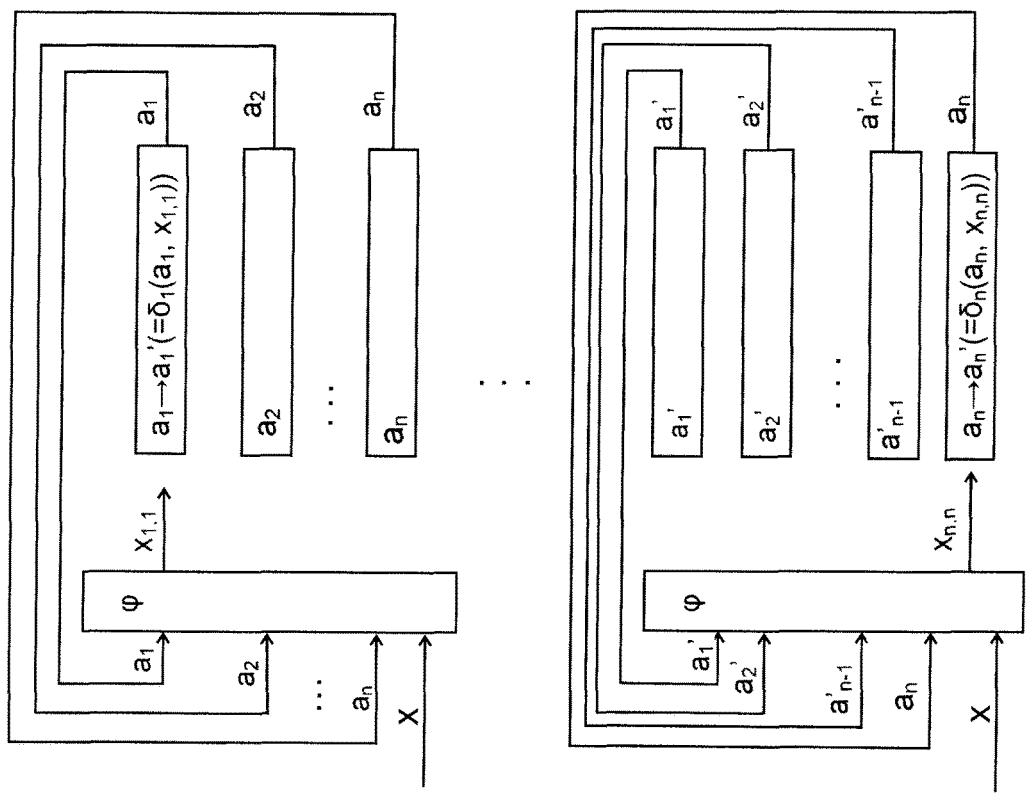
FIG. 6 is the flowchart of the operation of a sequentially operated Glushkov product.

According to the invention another type of product of automata may also be applied, which operates in a slightly different way from what was described above. This is called sequential-operation Glushkov product. The sequential-operation Glushkov product is illustrated in FIG. 6. The components of the sequential-operation Glushkov product is defined similarly to the original Glushkov product, but the transitions of the sequential-operation Glushkov product are defined in a different way.

Namely, an input signal x of the sequential-operation Glushkov product takes the product automaton from a state ($a_1, \ldots, a_n$) to a state ($a'_1, \ldots, a'_n$) that is defined as follows:
1. The vector ($x_{1,1}, \ldots, x_{1,n}$) assigned by the function to the vector ($a_1, \ldots, a_n$, x) is determined, and $a'_1$ becomes the state found in the $j_1$-th row and $l_1$-th column of the transition table of the first automaton. This step is illustrated at the top of FIG. 6. According to the above, the following equation can be written applying the feedback function:

$$a'_1 = \delta_1(a_1, x_{1,1})$$

where $x_{1,1}$ is the first component of the vector $\varphi(a_1, \ldots, a_n, x)$.

2. Next, the vector $(x_{2,1}, \ldots, x_{2,n})$ assigned by the function $\varphi$ to the vector $(a'_1, a_2, \ldots, a_n, x)$ is determined, with $a'_2$ becoming the state found in the $j_2$-the row and $i_2$-th column of the transition table of the second automaton. The applicable equation is $a'_2 = \delta_2(a_2, x_{2,2})$. It is important to note that in this step the function $\varphi$ has the vector $(a'_1, a_2, \ldots, a_n, x)$ as one of its arguments, meaning that compared to step 1 above there is a new value in the first argument.

3. In the next steps the states $a'_2, \ldots, a'_{n-1}$ are determined, which are sequentially inserted among the arguments of the function $\varphi$.

4. Finally, the vector $(x_{n,1}, \ldots, x_{n,n})$ assigned by the function $\varphi$ to the vector $(a'_1, a'_2, \ldots, a'_{n-1}, a_n, x)$ is determined, and $a'_n$ becomes the state found in the $j_n$-th row and $i_n$-th column of the transition table of the $n^{th}$ (last) automaton.

In a manner similar to the above, during these steps $j_1$ is the number of input signal $x_{1,1}$ and $i_1$ is the number of state $a_1$ in the transition matrix of the first (base) automaton, $j_2$ is the number of input signal $x_{2,2}$ and $i_2$ is the number of state $a_2$ in the transition matrix of the second automaton, $j_n$ being the number of input signal $x_{n,n}$ and $i_n$ the number of state $a_n$ in the transition matrix of the $n^{th}$ (last automaton).

A further type Glushkov product operating in yet another way may also be applied according to the invention. By introducing constraints on the structure of the Glushkov product compared to the general Glushkov product structure, a key automaton having lower storage space and computational requirements may be obtained. A Glushkov product is called two-phase in case there is such a bipartite directed graph $D = (\{1, \ldots, n\}, E)$ that, in case the set of edge starting points is denoted by $V_1$ and the set of edge end points is denoted by $V_2$, and $A_1, \ldots, A_n$ denotes the sets of states of the factor automata of the Glushkov product and X denotes the set of input signals of the Glushkov product, then the Glushkov product is taken from each state $(a_1, \ldots, a_n)$ by an input signal x to such a state $(a'_1, \ldots, a'_n)$ for which state each $i \in V_1$, and for all such vertices $i_1, \ldots, i_j \in V_2$ for which $(i, i_1), \ldots, (i, i_j) \in E$ (i.e. they are fitted on edges), there is a function $f: A_{i_1} \times \ldots \times A_{i_j} \times X \to X_i$ (i.e. the Cartesian product of components corresponding to the $i_1 \ldots i_j$-th nodes and the set X), that the $i^{th}$ component of $\varphi(a_1, \ldots, a_n, x)$ can be obtained in the form $f(a'_{i_1}, \ldots, a'_{i_j}, x)$, each $i \in V_2$, and for all vertices $i_1, \ldots, i_k \in V_1$ for which $(i_1, i), \ldots, (i_k, i) \in E$ (i.e. they are incident on edges), there is a function $f: A_{i_1} \times \ldots \times A_{i_k} \times X \to X_i$ such that the $i^{th}$ component of $\varphi(a_1, \ldots, a_n, x)$ can be obtained in the form $f(a_{i_1}, \ldots, a_{i_k}, x)$.

Figure 7:
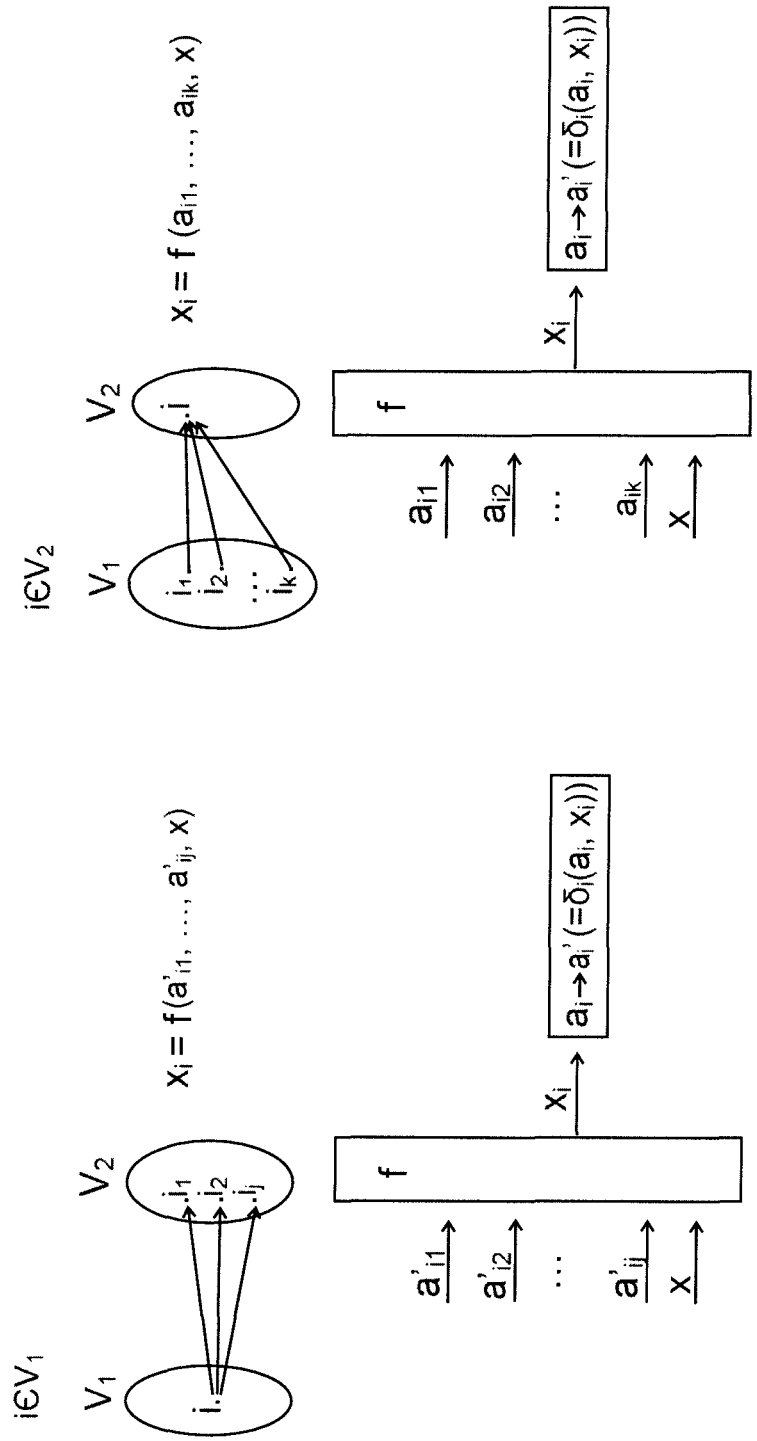
FIG. 7 is a schematic drawing illustrating the operation of a two-phase Glushkov product.

FIG. 7 illustrates the corresponding point pairs of the sets $V_1$ and $V_2$, as well as the functions f corresponding to the state transitions. In FIGS. 8-11 two-phase Glushkov products are illustrated.

In case D is given in an explicit manner, i.e. all the edges and vertices of the graph D are given (e.g. by enumeration), the two-phase Glushkov product in question is also called a two-phase, D-controlled Glushkov product.

In addition to the Glushkov product, another concept of the product of automata having an identical set of states may also be applied. Let $X_1, \ldots, X_n$ denote the set of the input signals of the automata $A_1, \ldots, A_n$ having a common set of states A, and let the automaton A having a set of states A and set of input signals $X_1 \times \ldots \times X_n$ be defined such that A is taken from a state a by an input signal $(x_1, \ldots, x_n)$ into the state $a_n$ which is obtained by taking a series $a_1, \ldots, a_n$ of the states of A for which $A_1$ is taken from state a by $x_1$ to state $a_1$, $A_2$ is taken from state $a_1$ by $x_2$ to state $a_2, \ldots$, and $A_n$ is taken from state $a_{n-1}$ by $x_n$ to state $a_n$. The automaton A generated in such a manner is called a temporal product of the automata $A_1, \ldots, A_n$ having a common set of states. Such a sequence of state transitions, i.e. the flowchart of the temporal product, is illustrated in FIG. 12. According to a preferred embodiment of the invention, a temporal product of automata is applied in the key automaton.

The feedback function of the Glushkov product is usually also interpreted as a function system $\varphi_1, \varphi_2, \ldots \varphi_n$ for which in case of an arbitrary state $(a_1, \ldots, a_n)$ and an arbitrary input signal x of the product of automata, for the function values of the function system $\varphi_1(a_1, \ldots, a_n, x) = x_1$, $\varphi_2(a_1, \ldots, a_n, x) = x_2, \ldots, \varphi_n(a_1, \ldots, a_n, x) = x_n$, provided that $\varphi(a_1, \ldots, a_n, x) = (x_1, x_2, \ldots, x_n)$. In the following, the last arguments of the functions $\varphi_1, \varphi_2, \ldots \varphi_n$ will also be termed input arguments, while the other arguments of the functions will be termed state arguments. Such an interpretation of the Glushkov product is illustrated in FIG. 13.

For a pair $i, j \in \{1, \ldots, n\}$ it is said that $\varphi_i$ is really independent of its a $j^{th}$ argument in case, for an arbitrary state written as $(a_1, \ldots, a_j, \ldots, a_n)$, $(a_1, \ldots, a_{j-1}, a'_j, a_{j+1}, \ldots, a_n)$ and an input signal x, $\varphi_i(a_1, \ldots, a_j, \ldots, a_n, x) = \varphi_i(a_1, \ldots, a_{j-1}, a'_j, a_{j+1}, \ldots, a_n, x)$. As it is seen from the formula, the function $\varphi_i$ is independent of its $j^{th}$ argument, since the value of the function $\varphi_i$ remains the same in case the $j^{th}$ argument is substituted by $a_j$ or $a'_j$. In the opposite case it is said that $\varphi_i$ is really dependent on the $j^{th}$ argument thereof.

Similarly, it can be said that $\varphi_i$ is really independent of its last argument if for an arbitrary state $(a_1, \ldots, a_j, \ldots, a_n)$ and input signal pair x, x' $\varphi_i(a_1, \ldots, a_n, x) = \varphi_i(a_1, \ldots, a_n, x')$. Then, $\varphi_i$ does not depend on whether the input signals x or x' appear among its arguments. In the opposite case it can be said that $\varphi_i$ is really dependent on the last argument thereof.

In the following, a function argument or multiple function arguments may be omitted in case the function is really independent of the arguments in question. This solution allows for the space-saving storage of function definitions. Namely, in case such a function is stored, the number of the argument of which the function is independent is specified, and only the remaining arguments are given in the table of function values. In case such functions are utilised in the compositions of automata applied in the invention, storage space may optionally be saved when storing the key automaton.

By putting various constraints on the feedback functions the concept of various product types can be introduced. Such product types may be expediently applied for compositions of automata of the apparatuses and methods according to the invention. These product types behave in the same way as the general Glushkov product, with the special feature that for certain arguments of the feedback functions of the factor automata such a constraint is made that the function is really independent of the given arguments, i.e. the value of these arguments does not affect the value of the function.

If for a nonnegative integer i and for each $j \in \{1, \ldots, n\}$ $\varphi_j$ is really depends at most on the state arguments having a number smaller than j+i and on the input argument, then the product is called an $\alpha_i$-product. If for a nonnegative integer i each component of the function system $\varphi_1, \varphi_2, \ldots \varphi_n$ may really depend on at most i state arguments and the input argument, then the product is called an $v_i$-product.

Figure 14A:
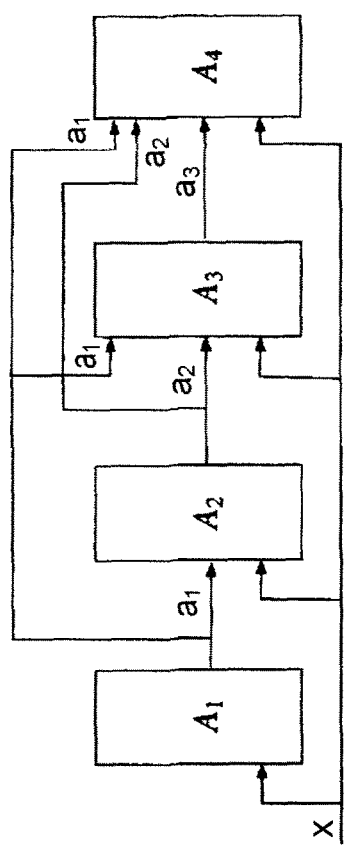
FIGS. 14A-14C are flow diagrams illustrating $\alpha_0$-, $\alpha_1$- and $\alpha_2$-products.
Figure 14B:
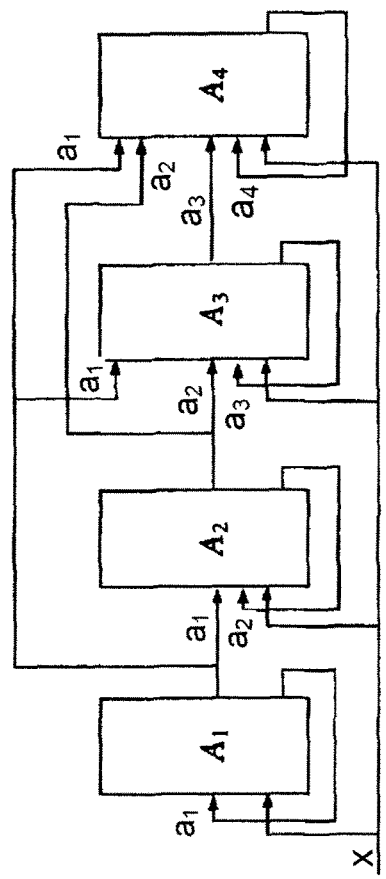
Figure 14C:
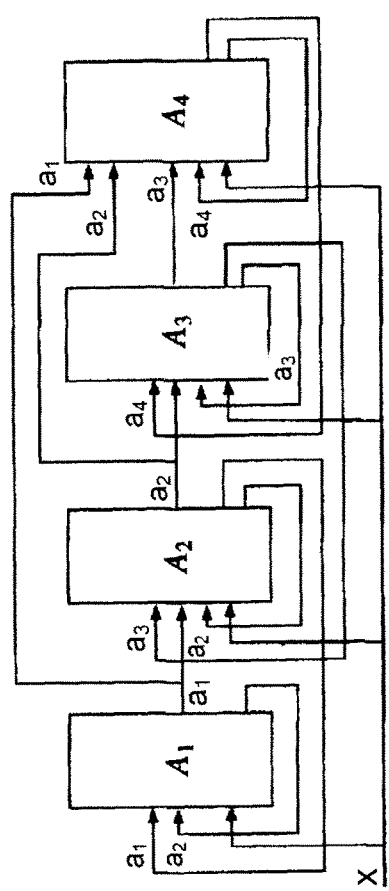
Figure 15A:
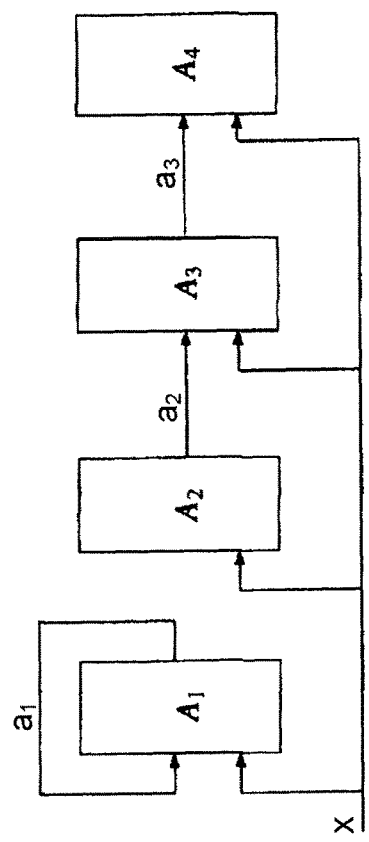
FIGS. 15A-15C are flow diagrams illustrating $v_1$-, $v_2$ and $v_3$-products.
Figure 15B:
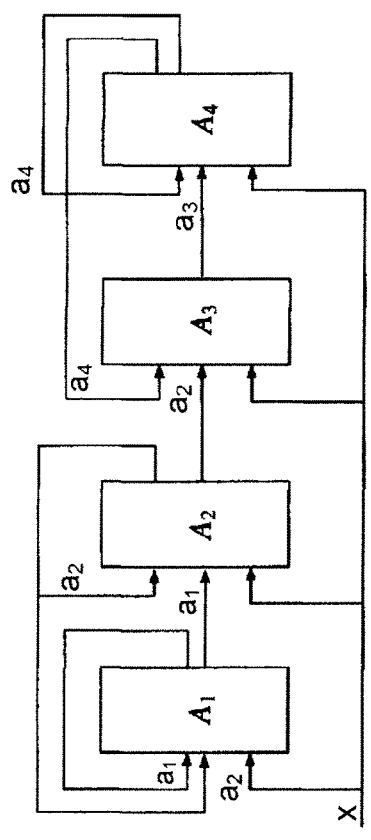
Figure 15C:
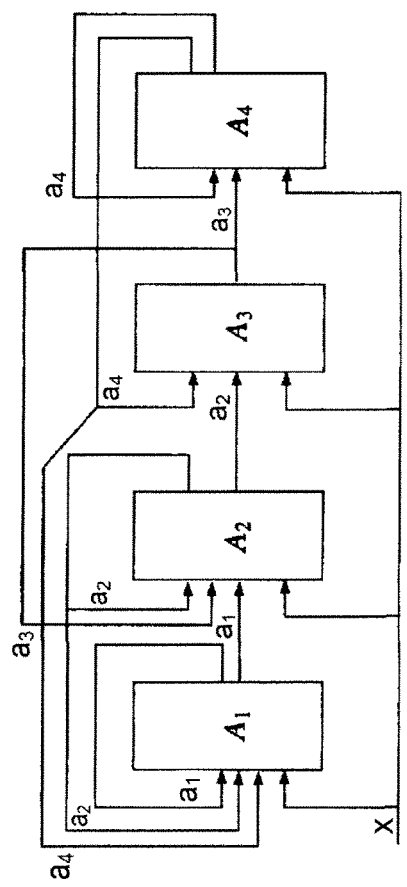

In FIGS. 14A-15C, exemplary $\alpha_i$- and $v_i$-products are illustrated. The above described general definitions are illustrated using the low index-number products shown in the figures. (FIG. 14A: $\alpha_0$-product; FIG. 14B: $\alpha_1$-product; FIG. 14C: $\alpha_2$-product; FIG. 15A: $v_1$-product; FIG. 15B: $v_2$-product; FIG. 15C: $v_3$-product). In the figures the factor automata $A_i$ are illustrated, the corresponding feedback functions being described in detail below.

As put forward above, in case of the $\alpha_0$-product shown in FIG. 14A the feedback function of each factor automaton (the factor automata according to the invention are permutation automata) may really depend only on the state arguments of the preceding factor automata and the input argument, i.e. $\varphi_1$ may really depend only on the input argument. $\varphi_2$ may really depend only on the first state argument and the input argument, $\varphi_3$ may really depend only on the first and second state arguments and the input argument. $\varphi_n$, in turn, may really depend only on the first, second, etc., $(n-1)^{th}$ (i.e. the last but one) state argument and the input argument.

In other words, in case of an $\alpha_0$-product the feedback function of each factor automaton cannot really depend either on its own state arguments or on the state arguments of its successor factor automata.

In case of the $\alpha_1$-product illustrated in FIG. 14B, the feedback functions of the factor automata may only depend on the arguments of the preceding factor automata, their own state argument, and the input argument, i.e. $\varphi_1$ may really depend only on the first state argument and on the input argument, $\varphi_2$ may really depend only on the first and second state arguments and the input argument, $\varphi_{n-1}$ may really depend only on the first, second, etc., $(n-1)^{th}$ state arguments and the input argument, and $\varphi_n$ may really depend on any of its arguments.

In other words: in case of an $\alpha_1$-product the feedback function of each factor automaton cannot really depend on the state arguments of its successor factor automata.

In case of the $\alpha_2$-product illustrated in FIG. 14C, the feedback function of each factor automaton may only depend on the arguments of the preceding factor automata, its own state argument, the state argument of the immediately following factor automaton, and the input argument, i.e. $\varphi_1$ may really depend only on the first and second state arguments and the input argument, $\varphi_2$ may really depend only on the first, second, and third state arguments and the input argument, $\varphi_{n-2}$ may really depend only on the first, second, etc., $(n-3)^{th}$ state argument and the input argument, and $\varphi_{n-1}$ as well as $\varphi_n$ may really depend on any of the arguments.

In other words, in case of an $\alpha_2$-product the feedback function of each factor automaton cannot really depend on the state arguments of the factor automata coming after the immediately following factor automaton.

Another much studied family of products is the family of $v_i$-products.

In case of a $v_1$-product, the feedback function of each factor automaton may really depend only on the argument of a single state and the input argument. Thereby, in this case only the number of real dependencies is limited, with no constraint being put on the topology of the product (i.e. on the arrangement of the factor automata).

FIG. 15A illustrates the actual dependency relations of the arguments of the feedback function of a $v_1$-product. Namely, $\varphi_1$ may really depend only on the first state argument and the input argument, $\varphi_2$ may really depend only on the input argument (thus there are no further dependencies here, although they would be allowed), $\varphi_3$ may really depend only on the second state argument and the input argument, and $\varphi_4$ may really depend only on the third state argument and the input argument.

FIG. 15B illustrates the actual dependency relations of the arguments of the feedback function of a $v_2$-product. (in these products, dependency on two arguments is allowed). Namely, $\varphi_1$ may really depend only on the first and second state arguments and the input argument, $\varphi_2$ may really depend only on the first and second state arguments and the input argument, $\varphi_3$ may really depend only on the second and fourth state arguments and the input argument, and $\varphi_4$ may really depend only on the third and fourth state arguments and the input argument.

FIG. 15C illustrates the actual dependency relations of the arguments of the feedback function of a $v_3$-product. (in these products, dependency on three arguments is allowed). Namely, $\varphi_1$ may really depend only on the first, the second and the fourth state arguments and the input argument, $\varphi_2$ may really depend only on the first, the second and the third state arguments and the input argument, $\varphi_3$ may really depend only on the second and fourth state arguments and the input argument, and $\varphi_4$ may really depend only on the third and fourth state arguments and the input argument.

The application of the product types illustrated in FIGS. 14A-15C in compositions of automata utilised in the apparatuses and methods according to the invention allows the reduction of storage space requirements and computational demand compared to a general Glushkov product, but at the same time a high level of complexity of the applied compositions of automata remains, which makes it impossible to break the system using brute force attack. The $I_x$ and $I_y$-products described below are even more advantageous as far as storage space and computational requirements are concerned, and their complexity is on a level that can prevent a brute force attack from being successful.

In case $\varphi_1$ really depends only on the last state argument and the input argument, and for each further $i \in \{2, \ldots, n\}$ $\varphi_i$ may really depend at most only on the $(i-1)^{th}$ state argument and the input argument, the product is said to be a loop product or I-product. It is shown that in case of an I-product dependency on the "preceding" state argument and the input argument (and, in case of the first state, dependency on the last state argument) occurs. Accordingly, as regards the dependency on specific arguments, in the I-product the feedback functions $\varphi_i$ form a chain, each one being dependent on the "preceding" argument (the argument having an index one less than current one).

A generalization of the I-product where for each $i \in \{1, \ldots, n\}$ $\varphi_i$ may really depend also on the $i^{th}$ state argument is called an $I^\lambda$-product. In this case, therefore, $\varphi_i$ is dependent on the $i-1^{th}$ and the $i^{th}$ arguments. If $\varphi_i$ may really depend at most only on the first, second and the last state argument and the input argument, and for each further $i \in \{2, \ldots, n\}$ $\varphi_i$ may really depend at most only on the $(i-1)^{th}$, $i^{th}$, and $(i+1)^{th}$ state argument and the input argument, the resulting product is a so-called ring product. In case of ring products, therefore, in addition to the dependency on the current argument, dependencies on the arguments having indices one less, the actual and one bigger. For products structured in such a way, special dependency rules are introduced for the arguments having the smallest and biggest index.

If for a directed graph $D=(\{1, \ldots, n\}, E)$ for each $i \in \{1, \ldots, n\}$ $\varphi_i$ may really depend only on the input argument and on such state arguments with the index k for which $k \in \{j: (j, i) \in E\}$, the product is called a D-product. A D-product is therefore obtained if a graph is assigned to the Glushkov product, and $\varphi_i$ depends on the $k^{th}$ arguments corresponding to the $k^{th}$ vertices that are connected with the $i^{th}$ vertex by an edge. If D is an element of a class $\Delta$ of directed graphs (such as the class of bipartite graphs), then the Glushkov product in question is also called a $\Delta$-product. Accordingly, therefore, if for instance $D=(\{1,2,3,4,5\}, \{(1,3),(1,4),(5,2)\})$ and $\Delta$ is the class of bipartite graphs, then those Glushkov products which are D-products may also be called bipartite graph-products.

The definition of the feedback function may be simplified to a great extent in case all components of the function system $\varphi_1, \varphi_2, \ldots, \varphi_n$ are trivial or almost trivial mappings. For instance, if the sets of states of the factor automata of the Glushkov product are denoted by $A_1, \ldots, A_n$, and the set of input signals of the Glushkov product is denoted by X, and the functions $$f_1: A_1 \times X \to A_1, f_2: A_2 \times X \to A_2, \ldots f_n: A_n \times X \to A_n$$

are defined such that if for each $i \in \{1, \ldots, n\}$ $\varphi_i$ may depend at most on the state arguments indexed $i_1, i_2, \ldots, i_t \in \{1, \ldots, n\}$ and on the input argument, and $i_1 < i_2 < \ldots < i_t$, then for an arbitrary state $(a_1, \ldots, a_n)$ and input signal x of the Glushkov product $$\varphi_i(a_1, \ldots, a_n, x) = (f_{i_1}(a_{i_1}, x), f_{i_2}(a_{i_2}, x), \ldots f_{i_t}(a_{i_t}, x), x).$$

Thereby, the set $i_1 \ldots i_t$ is assigned to i, and the dependency of the $i^{th}$ component of the feedback function is defined using the functions $f_{i_1} \ldots f_{i_t}$. Obviously, in this case it is sufficient to specify a directed graph D for which the Glushkov product constitutes a D-product. That is because for each $i \in \{1, \ldots, n\}$, exactly those edges point to the vertex indexed i of the graph which have the targets $i_1, i_2, \ldots, i_t$. From this it may be seen that for each $j \in \{1, \ldots, t\}$ the $j^{th}$ argument of the function $\varphi_i$ will be the function value $f_{i_j}(a_{i_j}, x)$, where $f_{i_j}$ is a function vector $(f_1, \ldots, f_n)$, and $a_{i_j}$ is the $i_j$-th component of the state vector $(a_1, \ldots, a_n)$. The matter can be further simplified if the elements of the set of input signals X of the Glushkov product are vectors having n components, and the elements of the function system $\varphi_1, \varphi_2, \ldots \varphi_n$ really depend only on one or two components of those vectors. For instance, if $X = X_1 \times X_2 \times \ldots \times X_n$, and the functions $$f_1: A_1 \times X_1 \to A_1, f_2: A_2 \times X_2 \to A_2, \ldots f_n: A_n \times X_n \to A_n$$

are defined (in a tabular form, or in any other manner) such that for each $i \in \{1, \ldots, n\}$ $\varphi_i$ may depend at most on the state arguments indexed $i_1, i_2, \ldots, i_t \in \{1, \ldots, n\}$, and on the input argument, and $i_1 < i_2 < \ldots < i_t$, then for an arbitrary state $(a_1, \ldots, a_n)$ and an arbitrary input signal $x = (x_1, \ldots, x_n) \in X$ $(=X_1 \times X_2 \times \ldots \times X_n)$ of the Glushkov product $$\varphi_i(a_1, \ldots, a_n, x) = (f_{i_1}(a_{i_1}, x_{i_1}), f_{i_2}(a_{i_2}, x_{i_2}), \ldots f_{i_t}(a_{i_t}, x_{i_t}), x_i),$$

that is, when determining the values of the functions $\varphi_i$, for each such $i \in \{1, \ldots, n\}$ the function values $\varphi_i(a_1, \ldots, a_n, (x_1, \ldots, x_n))$ are affected only by the $i_1$-th, ..., $i_t$-th and i-th components of the input signal vectors. In this case for such an $i \in \{1, \ldots, n\}$, the set of input signals of the i-th factor of the Glushkov product is composed of vectors having the structure $(b_{i_1}, b_{i_2}, \ldots, b_{i_t}, x_i)$, where $b_{i_1} = f_{i_1}(a_{i_1}, x_{i_1})$ is a state of the $i_1$-th component of the Glushkov product, $b_{i_2} = f_{i_2}(a_{i_2}, x_{i_2})$ is a state of the $i_2$-th component of the Glushkov product, ..., $b_{i_t} = f_{i_t}(a_{i_t}, x_{i_t})$ is a state of the $i_t$-th component of the Glushkov product, and $x_i$ is the i-th component of an input signal (regarded as a vector) of the Glushkov product. If, therefore, the product possesses the above property, has k input signals, and for each $i \in \{1, \ldots, n\}$ the number of possible values of the i-th components of the input signal vectors is denoted by $k_i$, then it follows that for each $i \in \{1, \ldots, n\}$ the number of rows of the transition table of the i-th factor of the Glushkov product is reduced to $k_i/k$ of the original number of rows (since instead of storing k rows it is sufficient to store only $k_i$ rows), which further facilitates space-efficient storage. Besides that, it still holds that for defining the transition table of this D-product it is sufficient to define D and the transition tables of the factor automata, as well as the tables of the functions $f_1, \ldots, f_n$. Finally, if some of the factor automata in the above D-product have identical structure, then it is sufficient to store only a single copy of the transition table for each of these types of factor automata.

Two automata are said to be state isomorphic if the set of states of the first automaton can be mapped onto the set of states of the second automaton applying a bijective mapping, such that by substituting the states of the first automaton in the transition matrix with their mapped counterparts and then reordering the columns of the resulting matrix the transition matrix of the second automaton can be obtained.

The below described automata, having the respective transition matrices $\delta$ and $\delta'$, are state isomorphic according to the following

| $\delta$ | 0 | 1 | 2 |
|---|---|---|---|
| x | 1 | 0 | 1 |
| y | 1 | 2 | 0 | and

| $\delta'$ | 0 | 1 | 2 |
|---|---|---|---|
| x | 2 | 0 | 0 |
| y | 1 | 2 | 0 |

$\delta$ and $\delta'$ are state isomorphic because substituting the state elements of the second matrix with their mapped counterparts applying the bijective mapping $t(0)=1$, $t(1)=2$, $t(2)=0$ the following is obtained:

| — | t(0) | t(1) | t(2) |
|---|---|---|---|
| x | t(2) | t(0) | t(0) |
| y | t(1) | t(2) | t(0) |

Substituting now the mapped state elements with the mapped values we obtain

| — | 1 | 2 | 0 |
|---|---|---|---|
| x | 0 | 1 | 1 |
| y | 2 | 0 | 1 |

Then, by an appropriate reordering of the columns the matrix

| —  | 0 | 1 | 2 |
|---|---|---|---|
| x | 1 | 0 | 1 |
| y | 1 | 2 | 0 | is obtained, which is identical with the transition matrix of the first automaton (disregarding the symbol in the upper left corner, applied for identifying the matrix). It is therefore proven that the automata corresponding to the transition matrices δ and δ' are state isomorphic.

By way of example, in the apparatuses and methods according to the invention such sequential-operation I-products are applied as key automaton, wherein the factor automata are state isomorphic automata to each other, with the sets of input signals and sets of states thereof comprising binary strings preferably having a length of 8, 4, or optionally 2 bits. The operation of this key automaton is illustrated for three feedback function components in FIG. 16. (For better clarity, FIG. 6 illustrating the operation of the presently applied key automaton shows the flowchart of a sequential-operation I-product which has only three factors. According to the invention it is suggested that sixteen- or thirty-two-factor sequential-operation I-product should be applied as a key automaton, however, for the sake of better understanding, in FIG. 16 a three-factor composition of automata is illustrated.) In the example illustrated in FIG. 16 the functions $\varphi_1$, $\varphi_2$, $\varphi_3$ are identical, and comprise the bitwise mod 2 addition (i.e. an exclusive OR logical operation) of two arguments as shown in the figure. The example shown in the figure has the following corresponding transition functions:

$$a'_1 = \delta_1(a_1, (a_3 \oplus x_3), x_1),\ a'_2 = \delta_2(a_2, (a'_1 \oplus x_1), x_2)\ \text{and}$$
$$a'_3 = \delta_3(a_3, (a'_2 \oplus x_2), x_3)$$

The transition functions $\delta_1$, $\delta_2$ and $\delta_3$ may expediently be identical; and mod 2 addition is denoted by the sign $\oplus$. As it can be seen from the transition functions, the input signals in this case comprise character pairs rather than simple characters. Or, to put it more precisely, the set of the input signals of the factor automata is the set of all such pairs of which both the first and second elements may assume all of the possible values of the characters set. In the apparatuses and methods according to the invention, the set of states and the set of input signals of the key automaton—implemented as a product of automata—are identical. However, this is not generally true for the individual factor automata that make up the product of automata. According to the present example, the set of input signals of each factor automata is obtained by taking the Cartesian product of its set of states with itself.

Figure 16:
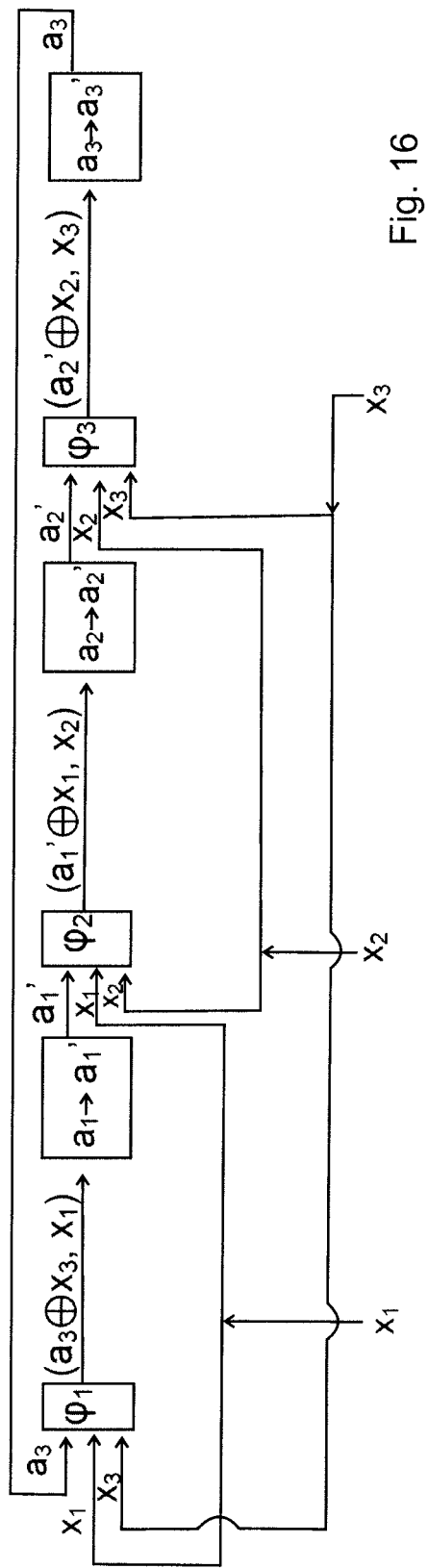
FIG. 16 is the flowchart of the operation of a three-factor sequential Glushkov product.

As it is illustrated in FIG. 16, and is also clear from the structure of the transition functions, the transition functions depend on states having an index one less than the current one as well as on the input signal, with the first transition function being dependent on the state having the largest index and on the input signal. In accordance with what was said above, FIG. 16 illustrates a three-factor sequential-operation I-product (or, as described below, an $I_x$-product).

Applying the key automata obtained utilising the compositions of automata generated by sequential-operation I-products, character strings having a block length of preferably 128 bits (i.e., 16 bytes) are processed in a single step. In case the composition of automata in question comprises sixteen factor automata, then the individual factor automata are adapted for processing binary strings having a length of 8 bits (128-bit-long character strings divided into 16 parts). Since an 8-bit-long binary string may have 256 different values, these automata have 256 states and 256×256 input signals (in this case, the states are constituted by the elements of a 256-element character set, and the input signals are character pairs formed using this 256-element character set). In case the composition of automata comprises thirty-two factor automata, then the individual factor automata are adapted for processing binary strings having a length of 4 bits (128-bit-long character strings divided into 32 parts). Since a 4-bit-long binary string may have 16 different values, these automata have 16 states and 16×16 input signals (in this case, the states are constituted by the elements of a 16-element character set, and the input signals are character pairs formed using this 16-element character set). And in case the composition of automata comprises sixty-four factor automata, then the individual factor automata are adapted for processing binary strings having a length of 2 bits (128-bit-long character strings divided into 64 parts). Since a 2-bit-long binary string may have 4 different values, each of these automata have 4 states and 4×4 input signals (in this case, the states are constituted by the elements of a 4-element character set, and the input signals are character pairs formed using this 4-element character set). Depending on how the sets of states and set of input signals of the factor automata are chosen, the sequential-operation I-products having the above properties will be called 8, 4, and 2-bit $I_x$-products, where the number of bits (8, 4, and 2) indicates the length of the binary strings processed by the individual factor automata. The number of factor automata of the $I_x$-product may be determined on the basis of the length of the binary strings to be processed by the individual factor automata.

The automata may be adapted for processing states and input signals represented applying an arbitrary character set, but it is expedient to convert all text and other (e.g. media) information to be processed as the data to be encrypted (unencrypted data) into binary format, i.e. to convert them into binary strings.

In the following, the first factor automaton of an $I_x$-product shall be called the base automaton of the $I_x$-product. An $I_x$-product is a permutation automaton if and only if the base automaton thereof is a permutation automaton. In the apparatuses and methods according to the invention, therefore, such $I_x$-products may be applied as a composition of automata of which the base automaton is a permutation automaton.

Thus, the base automaton must be a permutation automaton, since the $I_x$-product can constitute a key automaton in that and only in that case. As it was already mentioned, the input signals of the base automaton are not simple characters but two-dimensional vectors consisting of character pairs. It may be advantageous if the transition table of the base automaton constitutes a Latin cube, since then (1) under the effect of input signals (u,x), (u, y) fulfilling the condition x≠y the base automaton should go from each state thereof into states that are different from one another, (2) under the effect of input signals (u,x), (v, x) fulfilling the condition u≠v the base automaton should go from each state thereof into states that are different from one another.

According to condition (1), in case of a fixed u for each state a exactly one such x can be found for which under the effect of (u,x) the base automaton is taken to the state a. This feature may render statistical attacks more difficult. Condition (2) facilitates the development of the avalanche effect in the $I_x$-product.

In a manner similar to the sequential-operation Glushkov product, the sequential-operation variants of the above mentioned special types of Glushkov product may also be defined.

In the following such key automata will also be disclosed that may be generated as the Glushkov product of smaller-sized automata. In these cases, instead of storing the transition table of the key automaton it is preferable to store the transition tables of the component automata that make up the key automaton as well as the appropriate representations of the feedback functions of the Glushkov product. Due to the application of smaller-sized automata, such Glushkov products have lower storage space demand compared to more complex product types.

In some of the examples presented below, $I_x$-products are applied as a key automaton. Other types of operation that are significantly different from sequential operation may of course also be implemented. Our experiments have indicated that, in case $I_x$-products or $I_y$-products (to be described below) are applied in the key automaton, the storage space demand of the key automaton and the number of operations required for executing the key automaton are sufficiently low, while the structure of the applied composition of automata is complex enough to provide that it is statistically impossible to break it using the brute force attack.

A specially structured type of key automaton, which shall be called the $I_y$-product, may also be applied in the apparatuses and methods according to the invention.

Figure 8:
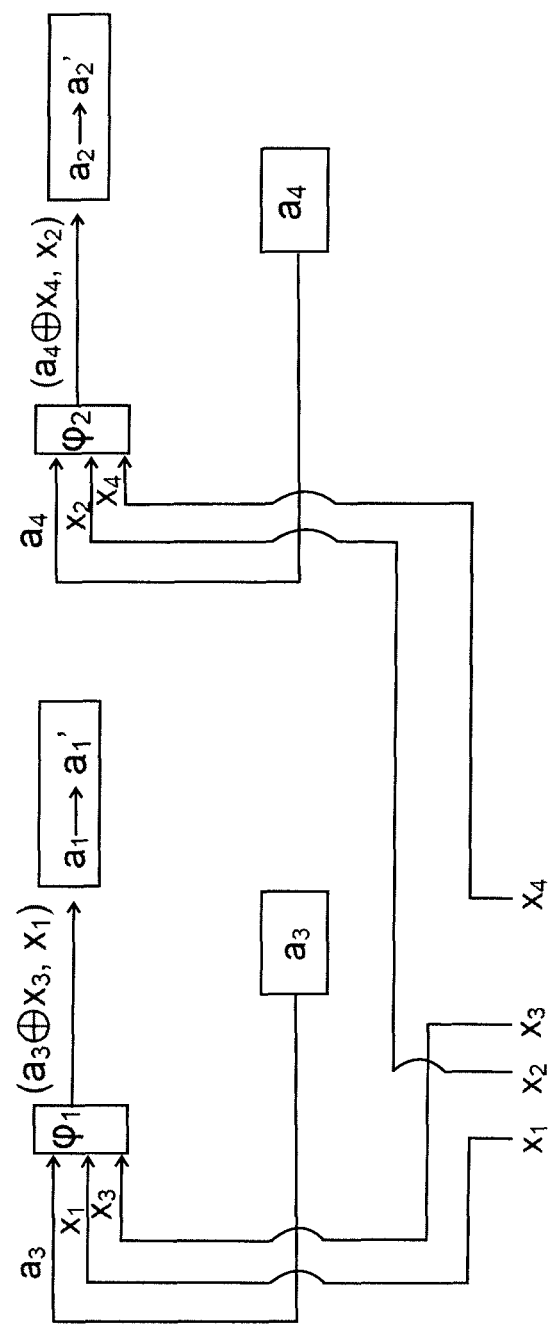
FIGS. 8-11 are flowcharts illustrating the operation of the phases of a four-factor, two-phase $1_y$-product
Figure 9:
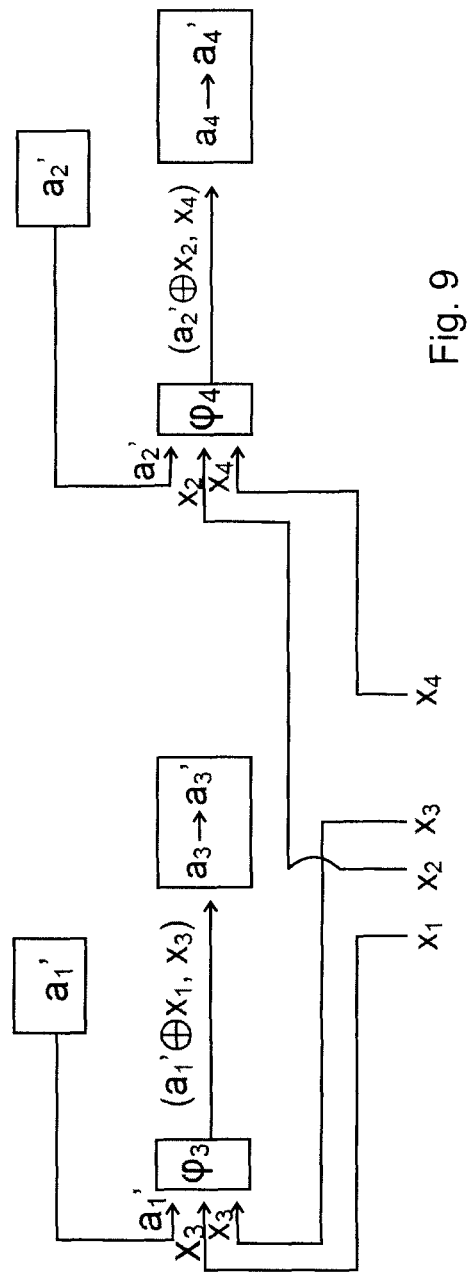
Figure 10:
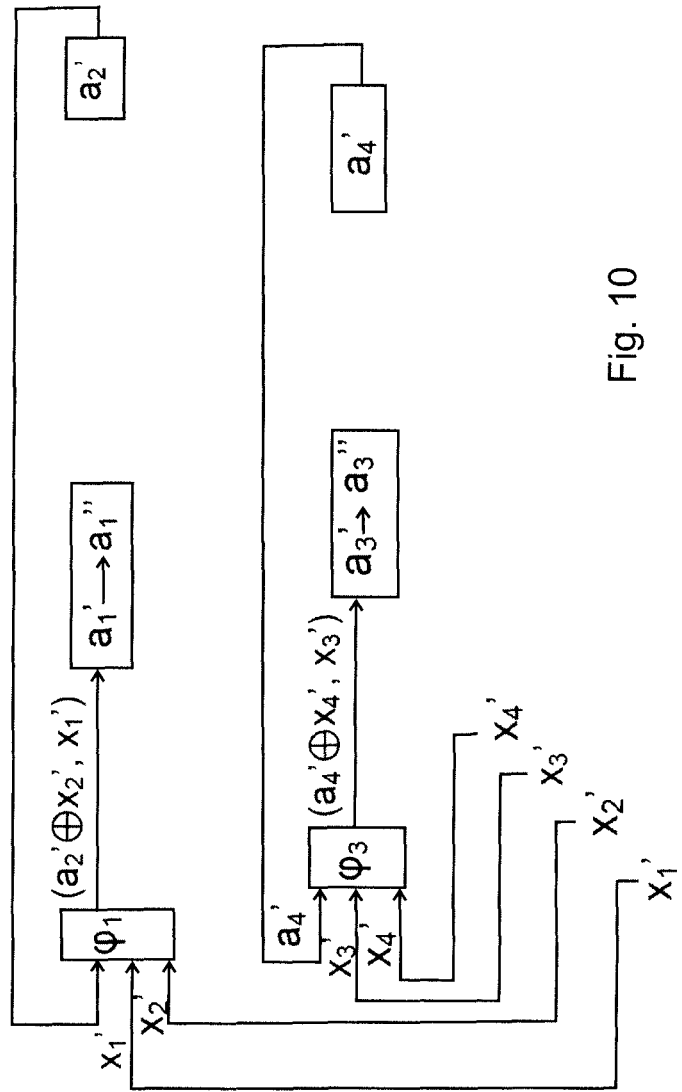
Figure 11:
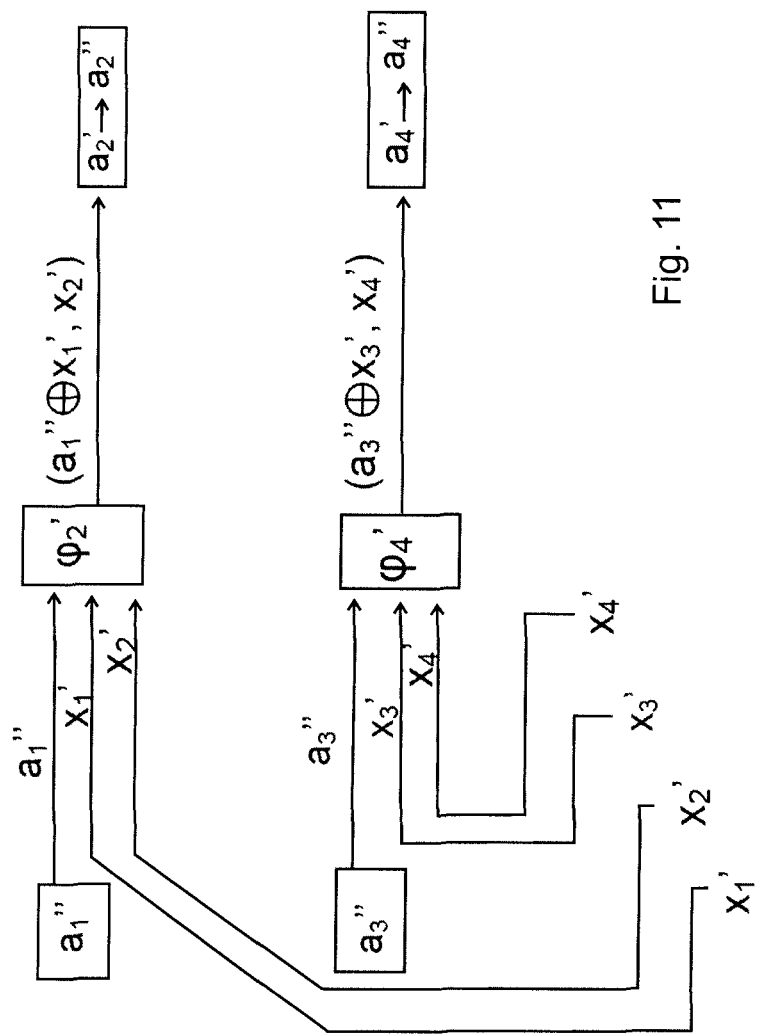

FIG. 8 illustrates with a flowchart how the first phase of the first temporal product factor of a four-factor $I_y$-product operates, while in FIG. 9 the flowchart illustrating the operation of the second phase thereof is shown. FIG. 10 illustrates with a flowchart how the first phase of the second temporal product factor of the same four-factor $I_y$-product operates, while in FIG. 11 the flowchart illustrating the operation of the second phase thereof is shown. (For the sake of clarity, FIGS. 8 to 11 illustrating the operation of the presently applied key automaton show the flowchart of an $I_y$-product that has only four factors. It is, however, suggested that in the apparatuses and methods according to the invention sixteen-factor $I_y$-products should be applied as a similarly structured key automaton.)

In the apparatuses and methods according to the invention, therefore, the applied composition of automata is, by way of example, preferably one of the following:
- a linear neighbourhood-structure Glushkov product of factor automata,
- a loop product-structure Glushkov product of factor automata,
- a ring-like neighbourhood-structure Glushkov product of factor automata,
- a $v_i$-type Glushkov product of factor automata,
- an $\alpha_i$-type Glushkov product of factor automata, or
- a Glushkov product of factor automata having a neighbourhood structure specified by a directed graph, or
the sequential-operation variant of the above mentioned Glushkov products, and/or the temporal product of the above mentioned Glushkov products. The composition of automata applied in the apparatuses and methods according to the invention may also be a combination of the above, but the application of a single given product type is preferred.

Let n denote a positive integer power of two (thereby the index $\log_2$ n is an integer). Now consider the factor automata $A_1, \ldots, A_n$ of an n-factor $I_x$-product, and define the following bipartite graphs:

$$D_1 = \{(n/2+1, 1), (n/2+2, 2), \ldots, (n, n/2)\}$$

$$D_2 = \begin{Bmatrix} (n/4+1, 1), (n/4+2, 2), \ldots, (n/2n/4), \\ (3n/4+1, n/2+1), (3n/4+2, n/2+2), \ldots, (n, 3n/4) \end{Bmatrix}$$

...

$$D_{(\log_2 n)-1} = \{(3, 1), (4, 2), (7, 5), (8, 6), \ldots, (n-1, n-3), (n, n-2)\}$$

$$D_{\log_2 n} = \{(2, 1), (4, 3), \ldots, (n, n-1)\}$$

For two binary strings a and b having identical length let a⊕b denote the binary string obtained by the bitwise mod 2 addition of a and b (i.e., the string obtained by an exclusive OR operation), and for each $D_k$, k=1, ..., $\log_2$ n take such a two-phase $D_k$-controlled Glushkov product of the factor automata $A_1, \ldots, A_n$ that for each i∈{1, ...,n}
(1) the i-th factor of $\varphi(a_1, \ldots, a_n, (x_1, \ldots, x_n))$ is $((a_j \oplus x_j), x_i)$, if (j,i)∈E, and
(2) the j-the factor of $\varphi(a_1, \ldots, a_n, (x_1, \ldots, x_n))$ is $((a'_i \oplus x_i), x_j)$, if (j,i)∈E,
where $a'_i$ denotes the state into which the i-th factor automaton goes under the effect of the input signal $((a_j \oplus x_j), x_i)$.

The temporal product of the two-phase Glushkov products $B_1, \ldots, B_{\log 2n}$ thus obtained is called the $I_y$-product of the automata $A_1, \ldots, A_n$. It is obvious also in the case of an $I_y$-product that it is a permutation automaton if and only if the base automaton thereof is a permutation automaton. Thus, the base automaton must be a permutation automaton, since the $I_y$-product may constitute a key automaton in that and only in that case. For reasons similar to those presented in relation to the $I_x$-product, it may be preferable if the transition table of the base automaton constitutes a Latin cube.

The security of the apparatuses and methods may be further improved in case the operation of the $I_x$- or $I_y$-products is complemented by bit shuffling operations, i.e. after each operating cycle, instead of the originally generated state, a state generated by taking a fixed permutation of the bits of the originally generated state by a well-defined and unequivocally reversible process is applied. Of course, bit shuffling may be applied not only for $I_x$- or $I_y$-products but in all such cases wherein the states of the key automaton are binary strings having a fixed length.

As it was already mentioned above in relation to FIGS. 2 and 3, according to the invention it has been recognised that the application of composition of automata obtained utilising permutation automata allows for the efficient storage of larger-sized key automata. It was shown through the examples of FIGS. 2 and 3 that a particularly high amount of storage space may be saved in case the permutations to be applied within and among the individual blocks of the automata are defined by giving the permutation rules.

In case, therefore, a composition of automata is applied as a key automaton, it is sufficient to store the structure of the composition, the communication functions of the component automata, and the types of elementary automata that make up the composition.

Furthermore, the application of the so-called Glushkov product of automata as a composition of automata allows for the application of a key automaton of extremely large size using a relatively low amount of storage space. In the apparatuses and methods according to the invention, the ratio of the length of the ciphertext to the length of the plaintext is preferably close to 1.

According to the above, therefore, in the inventive apparatuses and methods the key automaton—obtained as a composition of automata using at least one, preferably finite, permutation automaton without output signals—is utilised for both the encryption and the decryption operations.

The—preferably finite—permutation automaton with identical set of states and set of input signals that is applied according to the invention is preferably generated as the Glushkov product of smaller-sized finite permutation automata. Since the character sets of the plaintext and the ciphertext are identical, for a natural number b the set of states and the set of input signals are the set of all the possible blocks having a length b of the unencrypted data (the plaintext), and, at the same time, also constitute the set of all possible blocks having a length b of the encrypted data (the ciphertext). According to the invention a block cipher is applied.

There are widely used methods wherein during encryption the ciphertext is obtained by the bitwise mod 2 addition of a binary string generated by a pseudo-random number generator to the binary string that constitutes the character string of the plaintext. In these known methods, decryption is performed in a similar way: the plaintext is recovered by the bitwise mod 2 addition of the same binary string generated by a pseudo-random number generator to the binary string constituting the character string of the ciphertext.

In such known solutions it is naturally assumed that the structure of the pseudo-random number generator is unknown to the attackers, and also that—in order to provide for successful decryption—the ciphertext comprises (for instance, at the beginning) a core of the pseudo-random number generator based on which the pseudo-random number sequence applied for encryption can be generated again.

In some embodiments of the apparatuses and methods according to the invention, a pseudo-random number generator is preferably applied, but, as it is described in detail below, instead of a mod 2 addition a far more complex operation is performed, and this operation is performed on blocks having a given length.

The output of the pseudo-random number generator applied in some embodiments of the invention is constituted by pseudo-random character strings of a length b over a character set coinciding with the set of states and set of input signals of the automaton. As it is shown below, the pseudo-random number generator may preferably be the same automaton as the key automaton, except that the key automaton applied as the pseudo-random number generator is completed with an initial state, thus becoming an initial automaton.

Pseudo-random number generation is advantageously possible by means of an initial automaton which, except for having a fixed (secret) initial state, is identical in all respects to the automaton applied for the encryption and decryption process (and thereby, it has a set of states that is identical with its set of input signals). In this case, the core is a randomly chosen block that may at the same time be considered an input signal and also one of the states of the automaton. The so-called first auxiliary block will be the state of the automaton into which the automaton is taken from the initial state (i.e. the fixed secret block) by the core interpreted as an input signal. The so-called second auxiliary block will be that state of the automaton into which the automaton is taken from the core (interpreted as a state) by the fixed secret block interpreted as an input signal. Interpreting now the first and second auxiliary blocks as first and second states, the next (initially the first) pseudo-random number will be that state into which the automaton is taken from its current state by the input signal that is identical to the state that precedes current one.

Figure 17:
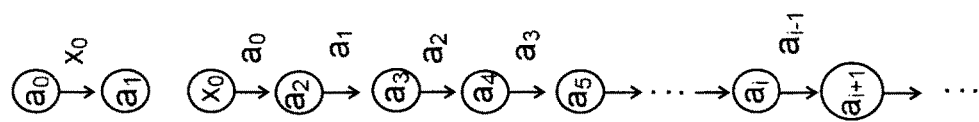
FIG. 17 is a flow diagram illustrating the operation of a pseudo-random number generator.

This process of this type of generation of a sequence of pseudo-random numbers is illustrated in FIG. 17. In the figure, the fixed secret block is $a_0$, and the core is $x_0$. The core is public, as in the present embodiment the ciphertext starts with the block containing it. However, it is modified for each single encryption process, even in case the plaintext remains the same. As it was mentioned above, the states $a_1$, $a_2$ are called auxiliary blocks, with $a_3$, $a_4$, $a_5$, $a_6$, etc. being called the first, second, third, fourth, . . . pseudo-random number.

This method yields two such auxiliary blocks $a_1$, $a_2$ that are completely unknown to those who only know the ciphertext, and thus are suitable for being applied as the initial blocks of the pseudo-random number generator. (In case of the pair $a_0$, $x_0$, $x_0$ is known, and it may even be pre-set in the course of a chosen-ciphertext attack. That is why the generation of pseudo-random numbers is not started with the pair $a_0$, $x_0$.)

In an embodiment of the method for encrypting unencrypted data according to the invention the core of a pseudo-random number generator is selected as the first block of encrypted data, and the next blocks of encrypted data are chosen to be the blocks identical with that state of the composition of automata into which the state identical to the next—initially the first—block of the unencrypted data is taken by that input signal of the composition of automata which is identical to the next—initially the first—block generated by the pseudo-random number generator.

In an embodiment of the method for decrypting encrypted data according to the invention the core being in the first block of encrypted data is separated, utilising the core, a series of blocks of pseudo-random numbers is generated (in a manner similar to the encryption process), and the next—i.e. initially the first—block of the unencrypted data is obtained by taking that state of the composition of automata from which state the composition of automata is taken by the next block—i.e. initially the first—of pseudo-random numbers into the state corresponding to the next block of the encrypted data out of all blocks of encrypted data.

It is an important consideration related to the application of the above described products in a key automaton that the so-called "avalanche effect" should occur. This means that changing a single character in the plaintext corresponding to a block of the ciphertext should result in the modification of all characters of the given ciphertext block, and vice versa, i.e. in case a single character is changed in a block of the ciphertext, it should result in the change of all of the characters of the corresponding block of the plaintext.

For security reasons the size of the key automaton applied in the apparatuses and methods according to the invention is preferably very large, the automaton preferably having $2^{128}$ states and an equal number of input signals. The storage of such large or even larger transition matrices of the key automata is cumbersome. However, if smaller-sized key automata were applied, brute force attacks might be successful. To overcome this double problem it is preferred to apply the Glushkov products of smaller-sized automata instead of utilising large-sized key automata. The storage of all the factors of these products would, however, also cause storage-capacity problems. Therefore, in some embodiments of the apparatuses and methods according to the invention it is expedient to apply such Glushkov products which consist of relatively few types of automata (then it is only necessary to store the different types of automata).

Storage space demand is further decreased in case a Glushkov power, i.e. a Glushkov product having identical factors, is applied instead of a general Glushkov product. An overly homogeneous structure, however, would decrease the number of possible states and thus would make it easier for an adversary to carry out a successful brute force attack. Therefore a Glushkov product consisting of state isomorphic variants of a single automaton is preferably applied. In this case, instead of storing the transition matrices of all of the factor automata, it is sufficient to store the transition matrix of a single factor automaton, as well as a suitable permutation of the set of states for each further state isomorphic variant of the given factor automaton, by way of example, a list of the states in a permuted order, in a manner presented above in relation to state isomorphic automata.

Each embodiments of the method according to the invention may be applied in conjunction with all embodiments—embodiments adapted both for encryption and decryption—of the apparatus according to the invention. In the following, such a method according to an embodiment of the encryption and decryption methods according to the invention, carried out applying a respective embodiment of the apparatuses according to the invention, is presented.

The encryption and decryption methods according to the invention are illustrated below by a simplified example; the method according to the invention can be generalised, mutatis mutandis, on the basis of the following.

In the embodiment described below a sequential-operation one-bit $I_x$-product consisting of four factor automata is applied as key automaton. The transition matrix of the first factor automaton is

| δ  | 0 | 1 |
|----|---|---|
| 00 | 0 | 1 |
| 01 | 1 | 0 |
| 10 | 1 | 0 |
| 11 | 0 | 1 |

In the $0^{th}$ row of the transition matrix the states are listed, the $0^{th}$ column thereof containing the possible input signals. The condition that the set of states and set of input signals of the key automaton obtained as a product of automata are identical to each other is fulfilled also in case of the present example. However, as presented above, in some embodiments, the sets of states and set of input signals of the factor automata may be different (the former containing one-character blocks, the latter containing two-character blocks). In our example, the factor automata other than the first one are not only state isomorphic but also identical to the first factor automaton (i.e. a four-factor $I_x$-power of the automaton in question is applied). According to the example shown in FIG. 2, the above transition matrix constitutes a Latin cube.

Let $A^4$ denote the $I_x$-product defined above. In the present embodiment a pseudo-random number generator is applied, for which the state 1010 is chosen as an initial state.

Consider now the automaton $A^4$ having the above described structure. In case the automaton $A^4$ (implemented as an $I_x$-product) is in a state abcd and receives the input signal vwxy (where each a,b,c,d,v,w,x,y is in $\{0,1\}$), then the automaton $A^4$ goes into a state a'b'c'd' consisting of the components $a'=\delta(a, (d \oplus y,v))$, $b'=\delta(b, (a' \oplus v,w))$, $c'=\delta(c, (b' \oplus w,x))$, $d'=\delta(d, (c' \oplus x,y))$ in $\{0,1\}$ defined by the above transition table and given applying transition functions, where $\oplus$ denotes bitwise mod 2 addition (i.e. the bitwise exclusive OR operation). The coordinates to be read out from the transition matrix are specified by the argument of the transition function. The first argument indicates the state, while the second argument (or, in this case, pair of arguments) indicates the input signal. The automaton $A^4$ is taken from state abcd under the effect of the input signal vwxy into the state a'b'c'd' such that each character of the character string corresponding to it is taken from one state to the other by a respective factor automaton. As it is seen from the formulas of the transition functions, the modification of one of the characters in a block results in the modification of the remaining characters also (a' is present in the argument of the transition function which returns b', b' is present in the argument of the transition function returning c', etc.), thus the above specified transition function formulas have a "shuffling" effect, which is advantageous for the security of the key automaton. Shuffling is facilitated also by the feature that, according to the transition matrix above the input signals of the factor automata have a length of two characters, while the length of their states is one character.

In the presently described embodiment the number of rounds of both the inventive encryption and decryption methods, as well as the number of rounds applied for pseudo-random number generation, is two.

In the following, the encryption procedure is described first. Consider the hexadecimal ASCII code of the word "OK", 4F4B (in our example, the unencrypted data are the word "OK"). The binary conversion of the code 4F4B is the string 0100111101001011. This string constitutes the unencrypted data, i.e. the plaintext. In the course of the encryption procedure, first a random input signal, e.g. 0110—chosen to be the core of the pseudo-random number generator—is fed to $A^4$.

Starting from the initial state, a series of pseudo-random strings is generated in a manner illustrated in FIG. 17:

under the effect of the input 0110, $A^4$ goes from the state 1010 to the state 1010, under the effect of 1010 it goes from the state 1010 to the state 0110, under the effect of 1010 it goes from the state 0110 to the state 1110, under the effect of 0110 it goes from the state 1110 to the state 1101, under the effect of 1110 it goes from the state 1101 to the state 1000, under the effect of 1101 it goes from the state 1000 to the state 1101, under the effect of 1000 it goes from the state 1101 to the state 1110, under the effect of 1101 it goes from the state 1110 to the state 1001, under the effect of 1110 it goes from the state 1001 to the state 1111.

Since the encryption of the chosen plaintext requires only that many pseudo-random numbers, it is not necessary to generate more of them. The first block of the ciphertext (the encrypted data) will be the core of the pseudo-random number generator, 0110.

Since the pseudo-random numbers are (initially) generated in two rounds (conforming to the chosen round number), the first pseudo-random number is obtained as a result of the second transition. Note that the generation of each pseudo-random number is immediately followed by generating the next ciphertext block. Introducing more than one rounds improves the security of the method.

The first block of the plaintext is 0100.

under the effect of the first pseudo-random number, 0110, $A^4$ goes from the state 0100 to the state 0001, under the effect of the second pseudo-random number, 1110, it goes from the state 0001 to the state 0000.

Since also the ciphertext blocks are generated in two rounds, the second ciphertext block will be 0000.

The second block of the plaintext is 1111.

under the effect of the third pseudo-random number, 1101, $A^4$ goes from the state 1111 to the state 0111, under the effect of the fourth pseudo-random number, 1000, it goes from the state 0111 to the state 0010.

Accordingly, the third ciphertext block is 0010.

The third block of the plaintext is 0100.

under the effect of the fifth pseudo-random number, 1101, $A^4$ goes from the state 0100 to the state 0101, under the effect of the sixth pseudo-random number, 1110, it goes from the state 0101 to the state 0111.

The fourth ciphertext block is therefore 0111.

The fourth block of the plaintext is 1011.

under the effect of the seventh pseudo-random number, 1001, $A^4$ goes from the state 1011 to the state 0100, under the effect of the eighth pseudo-random number, 1111, it goes from the state 0100 to the state 0111.

The fifth ciphertext block is thus 0111.

Applying the above generated sequence of pseudo-random numbers, therefore, the ciphertext (encrypted data) corresponding to the plaintext 0100111101001011 will be the concatenation of the strings 0110, 0000, 0010, 0111, 0111: 01100000001001110111.

The decryption procedure of the encrypted data is described below. In accordance with the features of the invention, in the present example identically structured key automata are applied for both encryption and decryption. First, it is recalled that because of the sequential operation the state abcd from which $A^4$ goes into a given state a'b'c'd' under the effect of a given input signal vwxy may be determined as follows:

d is the only such state of A for which the equation $d' = \delta(d, (c' \oplus x, y))$ holds, c is the only such state of A for which the equation $c' = \delta(c, (b' \oplus w, x))$ holds, b is the only such state of A for which the equation $b' = \delta(b, (a' \oplus v, w))$ holds, a is the only such state of A for which the equation $a' = \delta(a, (d \oplus y, v))$ holds.

Aware of c', d', x, and y we can determine d, aware of b', c', x, w we can determine c, and aware of b', c', x, w we can determine b from the transition table of A, and, having determined d, the transition table of A can be used to determine a knowing a', d, v, and y. As it is sufficient to use the transition matrix of the base automaton, the search of the above type may be performed very quickly.

Consider now the bit sequence 01100000001001110111 as the ciphertext.

First, the first ciphertext block, i.e. the string 0110 is read. This will be applied as the core of the pseudo-random number generator.

In a manner similar to the encryption procedure, the core is used to generate pseudo-random strings as follows:

under the effect of the input 0110, $A^4$ goes from the state 1010 to the state 1010, under the effect of 1010 it goes from the state 1010 to the state 0110, under the effect of 1010 it goes from the state 0110 to the state 1110, that is—considering that the first pseudo-random number is generated in two rounds—, the first two pseudo-random numbers generated are 0110 and 1110.

The next block of the ciphertext is 0000. Let us now determine the state by which $A^4$ is taken into 0000 under the effect of the second pseudo-random number, 1110. Carrying out the procedure mentioned at the beginning of the decryption section of our example, the second, third, fourth, and first factors of the sought state, namely, 1, 1, 0, and 1, are obtained. The sought state is therefore 1110. Now, the state by which $A^4$ is taken into 1110 under the effect of the first pseudo-random number, 0110, has to be determined. Carrying out once again the above procedure the second, third, fourth, and first factors of the sought state, namely, 1, 0, 0, and 0, are obtained. The sought state is therefore 0100. This will be the first block of the decrypted plaintext.

Making use of $A^4$, the third and fourth pseudo-random numbers are generated as follows:

under the effect of 0110 it goes from the state 1110 to the state 1101, under the effect of 1110 it goes from the state 1101 to the state 1000.

The next block of the ciphertext has a value of 0010. Now let us determine the state by which $A^4$ is taken into 0010 under the effect of the fourth pseudo-random number, 1000. In a manner similar to the above, the second, third, fourth, and first factors of the sought state, namely, 1, 1, 1, and 0, are obtained. The sought state is therefore 0111. Now, the state by which $A^4$ is taken into 0111 under the effect of the third pseudo-random number, 1101, has to be determined. Carrying out once again the above procedure, the second, third, fourth, and first factors of the sought state, namely, 1, 1, 1, and 1, are obtained. The sought state is therefore 1111. This string will be the second block of the decrypted plaintext.

The fifth and sixth pseudo-random numbers are generated using $A^4$ as follows:

under the effect of 1101 it goes from the state 1000 to the state 1101, under the effect of 1000 it goes from the state 1101 to the state 1110.

The value of the next block of the ciphertext is 0111. Let us now determine the state by which $A^4$ is taken into 0111 under the effect of the sixth pseudo-random number, 1110. In accordance with the above, the second, third, fourth, and first factors of the sought state, namely, 1, 0, 1, and 0, are obtained. The sought state is therefore 0101. Let us now determine the state by which $A^4$ is taken into 0101 under the effect of the fifth pseudo-random number, 1101. Carrying out once again the above procedure, the second, third, fourth, and first factors of the sought state, namely, 1, 0, 0, and 0, are obtained. The sought state is therefore 0100. That will be the third block of the decrypted plaintext.

Making use of $A^4$, the seventh and eighth pseudo-random numbers are generated:

under the effect of 1101 it goes from the state 1110 to the state 1001, under the effect of 1110 it goes from the state 1001 to the state 1111.

The next block of the ciphertext is 0111. Let us now determine the state by which $A^4$ is taken into 0111 under the effect of the eighth pseudo-random number, 1111. In accordance with the above, the second, third, fourth, and first factors of the sought state, namely, 1, 0, 0, and 0, are obtained. The sought state is therefore 0100. Now, the state by which $A^4$ is taken into 0100 under the effect of the seventh pseudo-random number, 1001, is determined. Carrying out once again the above procedure, the second, third, fourth, and first factors of the sought state, namely, 0, 1, 1, and 1, are obtained. The sought state is therefore 1011. This will constitute the fourth block of the decrypted plaintext.

The decrypted plaintext corresponding to the ciphertext 01100000001001110111 will therefore be the concatenation of the strings 0100,1111,0100,1011, namely, 0100111101001011. Thereby, the original plaintext has been recovered.

Figure 18:
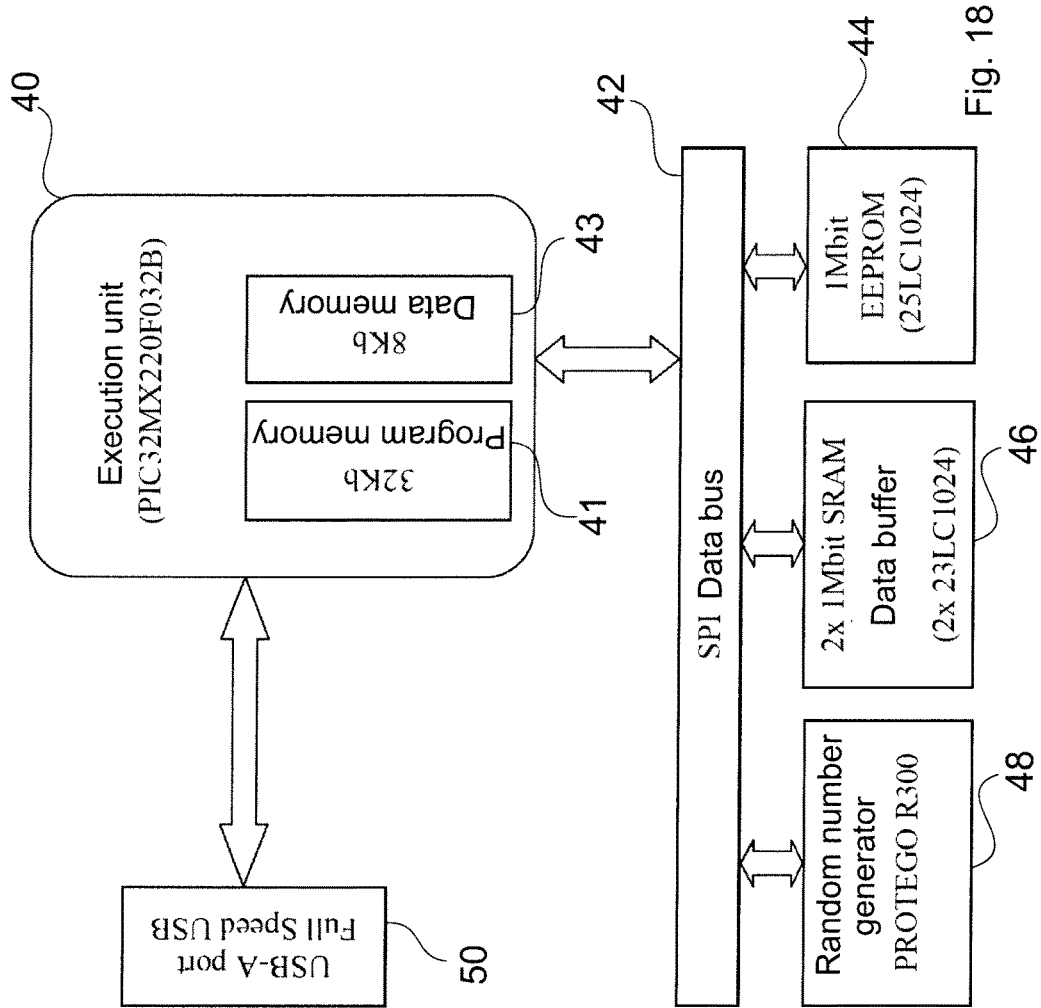
FIG. 18 is a flow diagram illustrating an embodiment of the cryptographic apparatus according to the invention.

In the following, an exemplary hardware implementation is presented that is capable of implementing the inventive apparatuses and carrying out the methods according to the invention. FIG. 18 illustrates an embodiment of the apparatus according to the invention. The cryptographic apparatus illustrated in the figure comprises a module 50 that may be applied both as an input and an output, and is connected to an execution unit 40 via a bidirectional data link. The execution unit 40 comprises integrated data memory 43 and program memory 41. With a further bidirectional data link the execution unit 40 is connected to an SPI data bus 42, with a key automaton 44, a data buffer 46 adapted for buffering input and output data, and a (pseudo) random number source 48, preferably random number generator being also connected to the SPI data bus 42 via bidirectional data links.

The exemplary cryptographic apparatus illustrated in FIG. 18 may be equally operated in encryption and decryption mode. In encryption mode, the plaintext is fed to the input of the apparatus, while in decryption mode, the ciphertext to be decrypted is fed thereto. In encryption mode the ciphertext appears at the output of the apparatus, while in decryption mode the decrypted plaintext may be displayed in its original form. The apparatuses according to the invention may also be applied for generating key automata from short (4-16-byte-long) secret keys.

The key automaton is preferably a four-bit $I_x$- or $I_y$-product consisting of 32 factor automata (or, in case larger storage space is available, preferably a sequential-operation eight-bit $I_x$- or $I_y$-product consisting of 16 factor automata), with the states and input signals thereof constituting character strings having a length of 16 bytes. In that case for the key automaton it is sufficient to store the transition matrix of the first factor automaton of the $I_x$-product or $I_y$-product, as well as 31 arrays, each having 16 half-byte-long elements (i.e., in case of the eight-bit implementation, 15 arrays of 256 elements each, having one-byte-long elements) corresponding to the second, third, . . . , last factor automaton, which arrays comprise a listing, i.e. a permutation of the states thereof, where for each of the arrays the $k^{th}$ element gives the index number of a state of the factor automaton corresponding to the given array that is isomorphic to the $k^{th}$ state of the first automaton (cf. the storage space reduction described in relation to FIGS. 2 and 3). Therefore, due to the state isomorphic property of the automata, storage can be simplified.

The storage demand of a transition matrix of a general product of automata may be significantly higher than the combined storage demand for transition matrices of the factor automata. If for a pair n, m a product of automata comprises n factor automata having m states, then the product of automata has $m^n$ states, which means that the transition matrix thereof has that many columns. At the same time, the transition matrix of each factor automaton has only m columns. If, for the sake of simplicity, it is supposed that both the product and its factor automata have the same number (k) of input signals, then the size of the transition matrix of the product of automata is $m^n \times k$, while for the storage of the factor automata it is sufficient to provide storage space for n transition matrices of a size of m×k. In case, therefore, the storage space requirement of the structure of the product is not exceedingly high, the storage space demand can be reduced, as well as it becomes possible to store factor automata for which it would be impossible to store the transition matrices because of the huge storage space that would be required. (For example, for n=16 and m=256 the transition matrix of the product of automata has $2^{128}$ columns, whereas the combined number of the columns of the 16 factor automata is only $2^{12}$. In this case, therefore, the required storage space can be reduced almost to $\frac{1}{2}^{116}$-th part of the original value if the entire factor automaton need not be stored.)

The storage demand can be reduced further in case the product of automata consists of factor automata that are either identical or state isomorphic to one another. In case the factor automata of the product of automata are identical, it is sufficient to store the transition matrix of a single copy of the factor automaton in addition to storing the structure of the product, since in that case the state transitions of each factor automaton can be determined using the transition matrix of the stored factor automaton and the structure of the product. If, for instance, the product has 16 factor automata, the space required for storing the factor automata is $\frac{1}{16}$-th part of the amount that would be required if each automaton was different from every other. This ratio becomes slightly worse if the factor automata are not identical but only state isomorphic to one another, because in that case the set of states permutations defining the state isomorphisms also have to be stored.

The key automaton defined utilising an eight-bit or four-bit $I_x$- or $I_y$-product may preferably be chosen such that the transition matrix of the base automaton of the $I_x$- or $I_y$-product in question constitutes a Latin right semi-cube, Latin left semi-cube or, more preferably, a Latin cube.

Such solutions may of course also be investigated where sequential or such other Glushkov products are considered that are more complex than the $I_x$- or $I_y$-products. That is because all other appropriate constructions of automata may be utilised as a key automaton which can be stored preferably in a compressed or in another form in the memory space allocated for them. However, compared to the $I_x$- or $I_y$-products this may cause an increase in the required storage space, as well as an increased amount of operations to be performed in the course of both the encryption and decryption procedures.

The key automaton may be a sequential-operation Glushkov product that, according to the above, constitutes a sequential-operation D-product for an appropriate directed graph such that the transition matrices of the finite automata making up the product, as compressed or uncompressed row-continuous order arrays, together with D, —either compressed as described above or represented as an uncompressed row-continuous array, together with optional further parameters—are stored in (annealed to) some kind of memory, e.g. flash memory. And, finally, in case the sequential-operation D-factor comprises factor automata having identical transition tables, then only one copy (instance) of each type of transition table of the automata comprised by the D-product is stored. In such cases, however, those individual automaton copies which constitute the respective factors of the sequential-operation D-product have also be stored in an appropriate array. A given state, as a matrix element located in the transition matrix of the key automaton 5 in a row corresponding to a given input signal and in a column corresponding to a given state, can be determined applying array search algorithms well known from the literature of the field, or by other known means. Other data compression or array management algorithms, or other algorithms known from literature, may of course also be applied.

Working data generated in the course of carrying out the method are stored in the data memory 43. The data memory 43 is adapted for storing the plaintext and the ciphertext having a block length b, the number of encryption and decryption rounds (in the following: f, preferably f=2), the current state of the key automaton (in the following: a), the initial state of the pseudo-random number generator (in the following: $a_0$), the number of rounds applied in the pseudo-random number generator (in the following: g, preferably g=2), the core m of the pseudo-random number generator, a previous pseudo-random number (in the following: $p_1$), and a current pseudo-random number (in the following: $p_2$). In decryption mode the data memory 43 also has to store a working array h that is capable of storing as many as g pseudo-random numbers.

The program adapted to carry out the encryption and decryption methods according to the invention may be stored in (annealed to) the program memory 41. The program is executed by the execution unit 40.

Modules of the present embodiment of the cryptographic apparatus may, by way of example, be implemented applying the following products:

The key automaton 44 is implemented by way of example in a 1-Mbit EEPROM unit of the type 25LC1024. By way of example, for operating the key automaton 44, for performing the encryption and decryption procedures, and for generating the key automaton 44 a Microchip PIC32MX220F032B microcontroller is applied. For example, 32 Kbytes of flash program memory 41 and 8 Kbytes of data memory 43 are integrated in the microcontroller. For buffering input and output data, by way of example two 1 Mbit SRAM memory modules of the type 23LC1024 (data buffer 46) are connected to the microcontroller via SPI bus. For example, a random number generator 48 of the type Protego R300 SMT is connected to the control unit via the SPI bus. FullSpeed USB controller may be integrated in the microcontroller. Utilising the USB controller, a communications channel conforming to the USB HID (Device Class Definition for Human Interface Devices (HID) Firmware Specification—6/27/01) standard may be implemented.

For a natural number b, preferably for b=32 or b=16, exactly one state of the key automaton 44 is assigned to each character string having a length b (i.e., to every possible string having a length b) consisting of the character set of the plaintext, that is, preferably of binary strings having a length of 4 or 8 bits (half a byte or one byte), the character strings being thus associated with the states of the automaton 44. These character strings are also interpreted as the input signals of the key automaton 44, i.e. the set of states of the key automaton 44 is identical to the set of the input signals thereof. The key automaton 44 is implemented as a permutation automaton, implying that the rows of the transition matrix are permutations of the set of states; under the effect of the same input signal the key automaton cannot go into the same state from two different states contained by the set of states.

The cryptographic apparatus according to the invention may be applied for performing encryption and decryption as described below. The steps of the encryption:

1. The parameters b (the block length in the plaintext and the ciphertext), f (the number of rounds applied for the encryption and decryption process), and $a_0$ (the fixed secret block of the pseudo-random number generator) are stored in the data memory 43 as initial data.

2. In the data memory 43, memory is allocated for a (the current state of the key automaton), m (the core of the pseudo-random number generator), $p_1$ (the current pseudo-random number), $p_2$ (the previous pseudo-random number), as well as the working array p.

3. A random sequence of characters having a length b is read into m from the random number generator 48.

4. $a_0$ is passed into $p_1$ and m is passed into $p_2$.

5. p is assigned the index number of that state of the key automaton into which state it is taken from the state indexed $p_1$ under the effect of the input signal indexed $p_2$.

6. The working array a is assigned the index number of that state of the key automaton into which it is taken from the state indexed $p_2$ under the effect of the input signal indexed $p_1$.

7. The working array a is passed into $p_1$ and p is passed into $p_2$.

8. The value m (becoming the first section of the ciphertext) is sent out as output data by the execution unit 40 through the module 50 functioning both as an input and output unit.

9. In the form of a sequence of character strings having a length b, the plaintext is fed to the execution unit 40 through the module 50. The encryption process is carried on by executing in a loop the steps from step 9.1 to step 9.7 until there are no more incoming characters, or until the encryption process is interrupted in some other way, in which cases the process is ended.

9.1. The next character string of a length b of the plaintext is fed to the execution unit 40 through the module 50. The value of the character string is passed to the parameter a stored in the data memory 43.

9.2 p receives the index number of that state of the key automaton into which state it is taken from the state indexed $p_1$ under the effect of the input signal indexed $p_2$.

9.3 $p_1$ is passed into $p_2$ and p is passed into $p_1$.

9.4 The following steps are executed f times:

9.4.1. As its new value, a receives the index number of that state of the key automaton into which it is taken from the state indexed a under the effect of the input signal indexed p.

9.5. The value of a stored in the data memory 43 is sent out as output data by the execution unit 40 through the module 50.

9.6. In case there are no more incoming characters, or the encryption process is interrupted in some other way, the encryption process is terminated.

9.7. The process is continued from step 9.1.

In case of application as an encryption apparatus, the above steps may be performed preferably for a four-bit $I_x$-product composed of 32 factor automata, or for a four-bit $I_y$-product composed of 32 factor automata.

The steps of the decryption process:

1. The parameters b (the block length in the plaintext and the ciphertext), f (the number of rounds applied for the encryption and decryption process), and $a_0$ (the fixed secret block of the pseudo-random number generator) are stored in the data memory 43 as initial data.

2. In the data memory 43, memory is allocated for a (the current state of the key automaton), m (the core of the pseudo-random number generator), $p_1$ (the previous pseudo-random number), $p_2$ (the current pseudo-random number), as well as the working arrays p and h.

3. The first character string, having a length b, of the ciphertext is fed to the execution unit 40 through the module 50. The value of the character string is passed to the array m stored in the data memory 43.

4. $a_0$ is passed into $p_1$ and m is passed into $p_2$.

5. p is assigned the index number of that state of the key automaton into which state it is taken from the state indexed $p_1$ under the effect of the input signal indexed $p_2$.

6. The working array a is assigned the index number of that state of the key automaton into which the automaton is taken from the state indexed $p_2$ under the effect of the input signal indexed $p_1$.

7. The working array a is passed into $p_1$ and p is passed into $p_2$

8. In the form of a sequence of character strings having a length b, the ciphertext is fed to the execution unit 40 through the module 50. The decryption process is carried on by executing, in a loop, the steps from step 8.1 to step 8.7 until there are no more incoming characters, or until the encryption process is interrupted in some other way, in which cases the process is ended.

8.1. The next (initially, the first) character string, having a length b, of the ciphertext is fed to the execution unit 40 through the module 50. The value of the character string is passed to the array a stored in the data memory 43.

8.2 p receives the index number of that state of the key automaton into which state it is taken from the state indexed $p_1$ under the effect of the input signal indexed $p_2$.

8.3 $p_1$ is passed into $p_2$ and p is passed into $p_1$.

8.4 The following steps are executed f times:

8.4.1 As its new value, h receives the index number of the state from which the key automaton is taken under the effect of the input signal indexed p into the state indexed a.

8.4.2 h is passed into the working array a.

8.5 The contents of the array a, stored in the data memory 43, are sent by the execution unit 40 via a bidirectional data link to the module 50 in the form of output data, that is, the next (initially the first) block of the decrypted plaintext.

8.6. In case there are no more incoming characters, or the encryption process is interrupted in some other way, the encryption process is terminated.

8.7. The process is continued from step 8.1.

In case of application as a decryption apparatus, the above steps may be executed preferably for a four-bit $I_x$-product composed of 32 factor automata, or for a four-bit $I_y$-product composed of 32 factor automata.

The above described encryption and decryption algorithms may also be implemented such that, rather than utilising the same pseudo-random number in every step, different pseudo-random numbers are applied in each step of the loops 9.4 (encryption) and 8.4 (decryption) in the course of encrypting the blocks of the plaintext or decrypting the blocks of the ciphertext. (It has to be provided, though, that during decryption the pseudo-random numbers utilised in the encryption process are used in a reverse order, i.e. in the first step of the decryption loop the pseudo-random number applied in the last step of the encryption loop should be used, in the second step of the decryption loop the number used in the last but one encryption step should be used, etc., and in the last step of the decryption loop the pseudo-random number used in the first step of the encryption loop should be applied.)

In the course of the encryption and decryption process, therefore, both the ciphertext and the recovered plaintext (the encrypted data and the unencrypted data) consist of blocks having a fixed length, preferably 16 bytes, which blocks are preferably generated applying a key automaton that is preferably a four-bit $I_x$- or $I_y$-product consisting of 32 factor automata (or, in case larger storage space is available, preferably an eight-bit $I_x$- or $I_y$-product consisting of 16 factor automata), with the states and input signals of the key automaton constituting character strings having a length of 16 bytes.

The ciphertext preferably starts with a character string of length b that is randomly generated at the beginning of the encryption process. The key automaton goes from a state having an index number corresponding to the next (initially the first) plaintext block taken as a character string into the state which coincides with the next block (initially, the first block following the initial random one) of the ciphertext. The encryption process according to the invention, of course, works also in case f=1 (f is applied in encryption step 9.4 and decryption step 8.4), but, to provide a sufficiently strong avalanche effect, in case $I_y$-products are applied, and provided that 16 component (factor) automata are used, a value f=8 should expediently be applied. In that case it may be proven using statistical methods that the avalanche effect is sufficiently efficient. If 32 component automata are applied, a value bigger than the above should be chosen for f.

The next (initially, the first) block of the decrypted plaintext is preferably generated by finding that state of the key automaton from which state the pseudo-random number generator having a core equal to the first block of the ciphertext goes under the effect of the next (initially, the first) input signal sequence into the state having an index corresponding to the next (initially, the second) block of the ciphertext. The state so determined will be the next (initially, the first) block of the plaintext.

The encryption and decryption methods according to the invention could also be implemented such that the roles of the plaintext blocks and pseudo-random character strings applied in the state transitions of the key automaton are reversed. (In this case, in order that the decryption operation can be performed unambiguously, the transition matrix of the base automaton should either constitute a Latin left semi-cube, a Latin cube, or a matrix consisting of such square matrices, written one below another, wherein each column of each square matrix is a permutation of the character set.) In the following, the $I_x$- and $I_y$-products modified in such a way will be called, respectively, $I_{xx}$-, and $I_{yy}$-products.

The encryption and decryption methods of the above described apparatus may also be implemented such that, in case more than one rounds are applied, each round is executed using the same pseudo-random number, moreover, it is also possible to use only a single pseudo-random number in the course of the encryption and decryption algorithms. Instead of a pseudo-random number sequence, such predetermined sequence of input signals may also be applied in the apparatuses and methods according to the invention for which the above described conditions hold; the application of a pseudo-random number generator is optional in the inventive apparatuses and methods.

The pseudo-random number generator may be of any type known from literature, but in a preferred embodiment the key automaton is applied for encryption and decryption in a manner that was detailed above in the section describing how pseudo-random numbers are generated preferably utilising an initial automaton (cf. FIG. 17).

It is of course also a conceivable option that in some embodiments the apparatuses and methods according to the invention utilise an $I_x$-product of the factor automata for pseudo-random number generation, while the steps of the encryption and decryption process are performed utilising an $I_y$-product of the factor automata (or the other way round).

According to known solutions, the key sharing operation of symmetric key systems (i.e. the exchange of the secret keys) is usually performed applying public key systems. As the key automata applied according to the invention are larger in size than the keys applied with typical known block ciphers, key generation algorithms adapted for generating the entire key automaton using shorter blocks or strings may be devised in order to reduce key size. The secret key applied for the apparatuses and methods according to the invention consists of the following elements: the transition matrix of the base automaton of the key automaton or all the data required for the generation thereof, the permutations required for determining the further factor automata, and the fixed (secret) block of the pseudo-random number generator.

For example, to generate a key automaton that constitutes an $I_x$- or $I_y$-product, first a base automaton has to be generated that is necessarily a permutation automaton, i.e. each of its rows is a permutation of the states. For safety reasons, this base automaton may be chosen such that the transition matrix thereof constitutes a Latin right semi-cube, a Latin left semi-cube, or even a Latin cube. After generating the base automaton, the permutations of the set of states of the base automaton should be generated, which represent the isomorphism of the second, third, . . . , last factor of the sequential-operation $I_x$- or $I_y$-product and the base automaton. Such a process of generating the transition matrices belonging to the composition of automata is illustrated in FIG. 19, where, e.g., a transition matrix 24 of the base automaton consists of 256 blocks 26a, 26b, . . . with a size of 256×256. Transition matrices 28, 30, . . . , 32 of the sixteen factor automata can be obtained from the transition matrix 24 by permutation.

In the following, a number of expedient and simple methods are described for generating the base automaton and the above described isomorphisms.

The permutations of the set of states may even be generated in a random manner. For a natural number n a permutation of a set of states $\{a_0, \ldots, a_{n-1}\}$ is defined by storing the elements of the set of states in an array T in the permuted order (cf. the examples shown in FIG. 2 and FIG. 3). Four- and eight-bit pseudo-random numbers, respectively, are generated in case of the four-bit and the eight-bit variants. First, T is filled up in a manner that for an arbitrary $i \in \{0, \ldots, n-1\}$ the $i^{th}$ element of the array T is $a_i$. Then, for each i=0, . . . , n−1 we execute the following:
we take the next pseudo-random number p,
if p is different from i, then the $i^{th}$ and $p^{th}$ elements of the array T are exchanged.

In the following, a simple preferred method is suggested for generating Latin squares, Latin right and left semi-cubes, and Latin cubes in a random manner, with the application of which the elements of a narrower but still very populous class of these structures may randomly generated.

In a manner similar to the above described case, two permutations $p(a_0), p(a_1), \ldots, p(a_{n-1})$ and $q(a_0), q(a_1), \ldots, q(a_{n-1})$ of the set of states are generated for which $p(a_0)=q(a_0)$.

The first row of the Latin square will be $p(a_0), p(a_1), \ldots, p(a_{n-1})$. For each further k=2, . . . , n the k-th row of the Latin square will be $p(a_s), p(a_{s+1}), \ldots, p(a_{n-1}), p(a_0), \ldots, p(a_{s-1})$, where $p(a_s)=q(a_{k-1})$.

By arranging n Latin squares in blocks one above the other a Latin left semi-cube is obtained, and if a Latin left semi-cube is rearranged such that for each pair i, j in $\{1, \ldots, n\}$ the $j^{th}$ row belonging in the $i^{th}$ block is generated from the $i^{th}$ row belonging in the $j^{th}$ block of the Latin left semi-cube, a Latin right semi-cube is obtained.

Finally, for generating a Latin cube three such permutations $p(a_0), p(a_1), \ldots, p(a_{n-1}), q(a_0), q(a_1), \ldots, q(a_{n-1})$, and $r(a_0), r(a_1), \ldots, r(a_{n-1})$ of the set of states are utilised for which $p(a_0)=q(a_0)=r(a_0)$. A method for generating such permutations was described in a previous section. First, the first Latin square is generated in a manner described above using the permutations $p(a_0), p(a_1), \ldots, p(a_{n-1})$ and $q(a_0), q(a_1), \ldots, q(a_{n-1})$. For each further k=2, . . . , n the k-th Latin square of the Latin cube is generated such that first row thereof will be that row of the first Latin square which starts with $r(a_k)$, and the subsequent rows will be the rows of the first Latin square starting, respectively, with the elements $q(a_{t+1}), \ldots, q(a_{n-1}), q(a_0), \ldots, q(a_{t-1})$, where $q(a_t)=r(a_k)$.

According to the inventive apparatuses and methods the key automaton must be a permutation automaton. In case, therefore, either one of the $I_x$- or $I_y$-products of the suggested type is chosen to perform the role of the key automaton, the base automaton also must be a permutation automaton. According to the four-bit variant, a state-isomorphic automaton may be chosen for the base automaton in as many as 16! (i.e. more than $2.092 \times 10^{13}$) different ways. Since the four-bit variant consists of 32 automata being state-isomorphic to each other, the number of possible key automata exceeds the number of possible base automata by a factor of more than $(16!)^{31}$, i.e. by a factor of more than $8.693 \times 10^{412}$ even in case only a single type of base automaton may be chosen. In a similar manner, according to the eight-bit variant, a state-isomorphic automaton may be chosen for the base automaton in as many as 256! (i.e. more than $8.578 \times 10^{506}$) different ways. Since the eight-bit variant consists of 16 mutually state-isomorphic automata, the number of possible key automata exceeds the number of possible base automata by a factor of more than $(256!)^{15}$, i.e. by a factor of more than $1.002 \times 10^{7724}$ even in case only a single type of base automaton may be chosen. Of course, the applied isomorphisms have to be specified in the secret key. $2^{128}$ is a slightly less than $3.403 \times 10^{38}$, for which number of cases brute force attacks are customarily regarded infeasible.

Further research is needed to determine the size of the smallest key automaton applying which the proposed cryptosystem is secure. This size depends on the type of the preferably applied Glushkov product, as well as on the internal structure of the factor automata and feedback functions. In case, for instance, four- or eight-bit $I_x$- or $I_y$-products are to be applied, and it is assumed for security or other reasons that the base automaton (and thus, also the other factor automata state isomorphic thereto) consists of Latin squares with sizes of 16×16 and 256×256, then because of the lack of theoretical results the quick generation of Latin squares is restricted to a relatively narrow class of all possible cases (which is still wide enough to provide for sufficient security). It should be noted here that the in the literature there is no known formula for determining the exact number of Latin squares of sizes larger than 11×11.

The apparatuses and methods according to the invention are essentially different from the concepts disclosed in Hungarian patents Reg. No. 227,781 and 229,534. The differences include, but are not limited to, the following:

The key automaton applied in the apparatuses and methods according to the invention has a different structure than the automata applied in the known solutions.

The inventive apparatuses and methods apply such encryption and decryption procedures which are based on different principles than the known solutions and allow the encryption and decryption procedures to be faster (to have fewer operational steps) than in known solutions.

The concept applied in the apparatuses and methods according to the invention allows that the ciphertext (encrypted/encrypted data) are not multiple times longer than the plaintext (unencrypted/unencrypted data), as according to the solution applied in the apparatuses and methods according to the invention the length of the ciphertext exceeds the length of the plaintext preferably only by the length of a fixed-size, relatively short random string, which makes the operation of the invention significantly more effective than the known solutions. This latter feature cannot be ensured in the concepts disclosed in Hungarian patents Reg. No. 227,781 and 229,534, as according to these solutions the ciphertext is multiple times longer than the plaintext.

It is allowed by the concepts applied in the apparatuses and methods according to the invention that the representations of large-size key automata may be stored using a relatively low amount of storage (in micro-sized implementations this allows for highly memory-efficient solutions).

Retaining the advantageous features of the solutions disclosed in Hungarian patents Reg. No. 227,781 and 229,534, the apparatuses and methods according to the present invention have a number of further advantages over the known cryptosystems.

Due to the application of pseudo-random numbers, according to the invention preferably several different ciphertexts may correspond to each plaintext. Because of the exceedingly high number of possible key automata, it is not feasible to determine the key automaton applied for the invention using the brute force attack.

Since the operating principle of the inventive apparatuses and methods is significantly different from the principles on which known encryption solutions are based, it is resistant to a number of attack types developed against known cryptosystems. (E.g. algebraic and correlation attacks and attacks based on number theory.)

The relatively simple structure of the applied key automaton allows that the invention may be successfully implemented by a micro-size realisation (applying a microcontroller, a smart card, etc.), and applied for instance in banking and personal identification/authentication systems as well as in broadcasting and datacasting and receiving equipment applied in restricted-access broadcasting and datacasting systems.

1) Resistance to code breaking and interventions. The encryption according to the invention is resistant to code breaking and interventions among others because it is very difficult to find the encryption key based on the ciphertext or even based on the encrypted form of a given message, as the key automaton is selected from a very large set in a random manner.

2) Several ciphertexts may correspond to each plaintext. The security of the present invention is also related to the fact that, for any given key, several ciphertexts correspond to each plaintext. If, for example, input signals of the key automaton have a length of 16 bytes, then, because the first 16 bytes of the ciphertext are chosen randomly, exactly $2^{128}$ different ciphertexts will correspond to one and the same plaintext. Thereby, also the attacks based on examining the frequency of internal repetitions of the ciphertext are bound to be unsuccessful. Moreover, due to the features of the encryption algorithm, the remaining part of the ciphertext depends not only on the plaintext but also on the value of the random character sequence constituting the first 16 bytes. This further implies that even if an attacker is in possession of a plaintext-ciphertext pair, the information cannot be used for detecting another encrypted copy of the same plaintext.

3) Fast operation. For testing purposes the software simulation of Hungarian patent Reg. No. 227,781 was implemented as a computer program written in C++. The implementation was tested on a conventional PC (IBM X40) running at 1.1 GHz. For a large-sized key automaton (with 256 input signals and 512 states) and a large block length (a minimum block length of 10 bytes and maximum block length of 65536 bytes) an encryption speed of approximately 120 kilobyte/sec and a decryption speed of 210 kilobyte/sec (measured on the plaintext) were measured by the tests.

For testing purposes the software simulation of the method according to the invention was implemented as a computer program written in C#. The implementation was tested on a PC having a dual-core Intel core i3-2100 processor clocked at 3.1 GHz and 4 GB of memory. In case of a key automaton constituting a large-size Glushkov product (with $2^{128}$ input signals and $2^{128}$ states) and with a block length of 16 bytes, an encryption speed of approximately 16.38 megabyte/sec and a decryption speed of approximately 17.82 megabyte/sec (measured on the plaintext) were measured.

4) Application of the invention for sending and receiving restricted-access digital broadcasts and datacasts. Compared to the test results obtained for the solutions applied in the Hungarian patent Reg. No. 229,534, the apparatuses and methods according to the present invention are even better suited for digital broadcasting, since in addition to the significantly increased encryption and decryption speeds, in case of the suggested solution the length of the ciphertext is only larger than the length of the plaintext by a negligible amount.

The key automaton may be reused as many times as required, without any further key sharing.

Furthermore, in case of the inventive apparatuses and methods security is extremely improved compared to the state of the art devices based on automata theory, without deteriorating the speed of the apparatus.

In contrast to cryptographic solutions based on Mealy automata, in case of the inventive cellular automata-based solution the plaintext is used as a state of the cellular automaton, and the ciphertext is obtained as the state reached after a predetermined number of transitions. Decryption is performed in a similar manner; starting from the ciphertext as a state the initial state is determined that at the same time is the decrypted plaintext.

In the apparatuses and methods according to the invention the plaintext may preferably contain: a digital signature stored in the starting slice of the plaintext utilised as a secret key for authentication and identification; the actual message itself; and, to make communication even more secure, the description of a newer key automation or certain portions thereof applicable for encrypting and decrypting the following message. The description of the next key automaton may be identical to the description of the current key automaton.

The invention is, of course, not limited to the preferred embodiments described in details above, but further variants, modifications, changes, and developments are possible within the scope of protection defined by the claims.

The invention claimed is:

1. A cryptographic apparatus for encrypting unencrypted data, comprising
   an input module for inputting the unencrypted data and an output module for outputting encrypted data, and
   a key automaton (44) adapted for converting the unencrypted data into the encrypted data,
   characterised in that
   the key automaton (44) is a composition of automata, said composition of automata having a set of states and a set of input signals identical to each other and being implemented as a permutation automaton without output signals, said composition of automata comprises at least one factor automaton without output signals, each of the unencrypted data and the encrypted data has a character set identical to each other, and the set of states and the set of input signals, respectively, consist of blocks obtained from all possible combinations of said character set, wherein the blocks are of a predetermined block length (b).

2. A cryptographic apparatus for decrypting encrypted data, comprising
   an input module for inputting the encrypted data and an output module for outputting unencrypted data, and
   a key automaton (44) adapted for converting the encrypted data into the unencrypted data,
   characterised in that
   the key automaton (44) is a composition of automata, said composition of automata having a set of states and a set of input signals identical to each other and being implemented as a permutation automaton without output signals, said composition of automata comprises at least one factor automaton without output signals, each of the unencrypted data and the encrypted data has a character set identical to each other, and the set of states and the set of input signals, respectively, consist of blocks obtained from all possible combinations of said character set, wherein the blocks are of a predetermined block length (b).

3. The apparatus according to claim 1, characterised in that the composition of automata is a Glushkov product of at least two factor automata.

4. The apparatus according claim 3, characterised in that the composition of automata is a Glushkov product comprising factor automata being state-isomorphic to each other.

5. The apparatus according to claim 3, characterised in that the composition of automata is any one, or a combination, of the following:
   a linear neighbourhood-structure Glushkov product of factor automata,
   a loop product-structure Glushkov product of factor automata,
   a ring-like neighbourhood-structure Glushkov product of factor automata,
   a $v_i$-type Glushkov product of factor automata,
   an $\alpha_i$-type Glushkov product of factor automata,
   a Glushkov product of factor automata having a neighbourhood structure specified by a directed graph, or
   a sequential-operation variant of said Glushkov products and/or a temporal product of said Glushkov products.

6. The apparatus according to claim 3, characterised in that the composition of automata is a sequential-operation loop product or a temporal product of two-phase Glushkov products.

7. The apparatus according to claim 1, characterised in that the composition of automata comprises a basic factor automata, a transition matrix of which constitutes a Latin right semi-cube, a Latin left semi-cube, or a Latin cube.

8. The apparatus according to claim 1, characterised in that the blocks are binary strings with a block length of 128 bits.

9. A cryptographic method for encrypting unencrypted data, comprising the steps of:
   converting the unencrypted data into encrypted data by means of a key automaton (44),
   characterised by
   applying a composition of automata as the key automaton (44), said composition of automata having a set of states and a set of input signals identical to each other and being implemented as a permutation automaton without output signals, said composition of automata comprises at least one factor automaton without output signals, each of the unencrypted data and the encrypted data has a character set identical to each other, and the set of states and the set of input signals, respectively, consist of blocks obtained from all possible combinations of said character set, wherein the blocks are of a predetermined block length (b).

10. The method according to claim 9, characterised in that in the course of converting by means of the key automaton (44)
    a core of a pseudo-random number generator is selected as the first block of the encrypted data, and
    next blocks of encrypted data are chosen to be the blocks identical with that state of the composition of automata into which the state identical to the next block of the unencrypted data is taken by that input of the composition of automata which is identical to the next block generated by the pseudo-random number generator.

11. A cryptographic method for decrypting encrypted data, comprising the steps of:
    converting the encrypted data into unencrypted data by means of a key automaton (44),
    characterised by
    applying a composition of automata as the key automaton (44), said composition of automata having a set of states and a set of input signals identical to each other and being implemented as a permutation automaton without output signals, said composition of automata comprises at least one factor automaton without output signals, each of the unencrypted data and the encrypted data has a character set identical to each other, and the set of states and the set of input signals, respectively, consist of blocks obtained from all possible combinations of said character set, wherein the blocks are of a predetermined block length (b).

12. The method according to claim 11, characterised in that in the course of converting by means of the key automaton (44)
    a core being in the first block of the encrypted data is separated,
    utilising the core, a series of blocks of pseudo-random numbers is generated, and
    the next block of unencrypted data is obtained by taking that state of the composition of automata from which state the composition of automata is taken by the next block of pseudo-random numbers into the state corresponding to the next block of the encrypted data out of all blocks of the encrypted data.

* * * * *